(12) United States Patent
Chen et al.

(10) Patent No.: US 10,003,998 B2
(45) Date of Patent: Jun. 19, 2018

(54) SYSTEMS AND METHODS FOR REDUCED OVERHEAD IN WIRELESS COMMUNICATION SYSTEMS

(71) Applicant: QUALCOMM Incorporated, San Diego, CA (US)

(72) Inventors: Wanshi Chen, San Diego, CA (US); Hao Xu, San Diego, CA (US); Tao Luo, San Diego, CA (US); Peter Gaal, San Diego, CA (US); Taesang Yoo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 295 days.

(21) Appl. No.: 13/797,716

(22) Filed: Mar. 12, 2013

(65) Prior Publication Data

US 2013/0294333 A1  Nov. 7, 2013

Related U.S. Application Data

(60) Provisional application No. 61/642,909, filed on May 4, 2012.

(51) Int. Cl.
*H04W 28/06* (2009.01)
*H04L 5/00* (2006.01)
(Continued)

(52) U.S. Cl.
CPC ........... *H04W 28/06* (2013.01); *H04L 5/0048* (2013.01); *H04L 5/005* (2013.01); *H04L 5/0051* (2013.01);
(Continued)

(58) Field of Classification Search
CPC ..... H04L 5/0053; H04L 5/005; H04L 5/0048; H04L 5/001; H04L 5/0023; H04L 1/0026;
(Continued)

(56) References Cited

U.S. PATENT DOCUMENTS 7,710,918 B2   5/2010  Jung et al.
2004/0166886 A1*  8/2004  Laroia et al. ................ 455/522
(Continued)

FOREIGN PATENT DOCUMENTS

CN  1677970 A  10/2005
CN  1833387 A   9/2006
(Continued)

OTHER PUBLICATIONS

International Search Report and Written Opinion—PCT/US2013/030810—ISA/EPO—dated Jun. 5, 2013.
(Continued)

*Primary Examiner* — Candal Elpenord
*Assistant Examiner* — Ricardo Castaneyra
(74) *Attorney, Agent, or Firm* — Liem T. Do

(57) ABSTRACT

Systems and methods are disclosed which implement one or more overhead reduction technique, if channel conditions favorable to implementation of overhead reduction are present. The one or more overhead reduction technique may have one or more restriction corresponding to the channel for which the overhead reduction technique is implemented. The one or more overhead reduction technique implemented may include time-domain bundling, frequency-domain bundling, and pattern adaptation. Pattern adaptation may include pattern code-domain reduction, pattern timing-domain reduction, and pattern frequency-domain reduction.

71 Claims, 15 Drawing Sheets

(51) Int. Cl.
*H04W 72/04* (2009.01)
*H04L 27/26* (2006.01)

(52) U.S. Cl.
CPC ......... *H04L 27/2613* (2013.01); *H04W 72/04* (2013.01); *H04W 72/044* (2013.01); *H04W 72/0453* (2013.01)

(58) Field of Classification Search
CPC ............ H04L 25/0224; H04L 27/2613; H04L 5/0051; H04L 27/261; H04L 25/0226; H04L 5/0005; H04W 72/0446; H04W 72/0406; H04W 72/1289; H04W 72/04; H04W 72/1226; H04W 72/042; H04W 72/085; H04W 36/30; H04W 28/06; H04W 72/0453; H04W 72/12; H04W 24/02; H04W 72/044
USPC ....... 370/252, 328, 330, 336, 294, 295, 319, 370/320, 321, 329, 347
See application file for complete search history.

(56) References Cited

U.S. PATENT DOCUMENTS

| | | | |
|---|---|---|---|
| 2006/0172704 A1* | 8/2006 | Nishio ................. | H04L 5/0007 455/67.11 |
| 2007/0133462 A1* | 6/2007 | Guey ............................ | 370/330 |
| 2007/0248113 A1* | 10/2007 | Ko et al. ....................... | 370/436 |
| 2009/0092194 A1* | 4/2009 | Wang ................... | H04L 5/0051 375/260 |
| 2010/0080154 A1 | 4/2010 | Noh et al. | |
| 2010/0232384 A1 | 9/2010 | Farajidana et al. | |
| 2010/0246527 A1 | 9/2010 | Montojo et al. | |
| 2010/0246559 A1* | 9/2010 | Ogawa .................. | H04L 5/0007 370/345 |
| 2011/0110444 A1* | 5/2011 | Roh ...................... | H04L 1/0003 375/260 |
| 2011/0141987 A1* | 6/2011 | Nam ..................... | H04L 1/0003 370/329 |
| 2011/0243066 A1 | 10/2011 | Nayeb et al. | |
| 2011/0286423 A1* | 11/2011 | Berggren ................. | H04L 5/001 370/329 |
| 2012/0002740 A1* | 1/2012 | Han et al. ..................... | 375/260 |
| 2012/0113930 A1* | 5/2012 | Kuroda et al. ................ | 370/329 |
| 2012/0155291 A1* | 6/2012 | Koivisto et al. ............... | 370/252 |
| 2013/0034070 A1 | 2/2013 | Seo et al. | |
| 2013/0272250 A1* | 10/2013 | Shimezawa et al. ......... | 370/329 |

FOREIGN PATENT DOCUMENTS

| | | |
|---|---|---|
| CN | 1891007 A | 1/2007 |
| CN | 1973459 A | 5/2007 |
| CN | 101313548 A | 11/2008 |
| WO | WO-2011056016 A2 | 5/2011 |

OTHER PUBLICATIONS

QUALCOMM Europe: "UE-RS Patterns for LTE-A," 3GPP TSG RAN WG1 #58 R1-093105, Aug. 24, 2009 (Aug. 24, 2009), pp. 1-9, XP008157183, Retrieved from the Internet <URL: http://www.3gpp.org/ftp/tsg_ran/WG1_RL1/TSGR1_58/Docs/, the whole document.

Berardinelli G, et al., "Transmission over multiple component carriers in LTE-A uplink," IEEE Wireless Communications, Aug. 2011, pp. 67-73, vol. 18 (4).

* cited by examiner

Normal Subframe

DwPTS Subframe with 11,12 symbols

DwPTS Subframe with 9,10 symbols

SYSTEMS AND METHODS FOR REDUCED OVERHEAD IN WIRELESS COMMUNICATION SYSTEMS

CROSS-REFERENCE TO RELATED APPLICATIONS

The present application claims priority to U.S. provisional patent application Ser. No. 61/642,909 entitled "SYSTEMS AND METHODS FOR REDUCED OVERHEAD IN WIRELESS COMMUNICATION SYSTEMS," filed May 4, 2012, the disclosure of which is hereby incorporated by reference herein in its entirety.

BACKGROUND

Field

Aspects of the present disclosure relate generally to wireless communication systems, and more particularly, to reducing reference signal overhead in wireless communication systems.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink (DL) and uplink (UL). The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

Release 10 of 3GPP Long Term Evolution (LTE), for example, provides for 9 downlink transmission modes. These modes include transmit diversity, Multiple-Input/Multiple-Output (MIMO), Code Division Multiplexing (CDM), etc. Downlink transmission mode 9 supports up to MIMO rank 8 Demodulation Reference Signal (DM-RS) based Physical Downlink Shared Channels (PDSCHs).

The DM-RS based PDSCH uses a predetermined DM-RS pattern, examples of which are shown in subframes 100A (normal subframe with 14 symbols), 100B (Downlink Pilot Time Slot (DwPTS) subframe with 11-12 symbols), and 100C (DwPTS subframe with 9-10 symbols) of FIGS. 1A-1C, in all of the Resource Blocks (RBs) assigned to the PDSCH to facilitate decoding of the PDSCH. For example, for PDSCHs transmitted at MIMO rank 2 or below, DM-RS patterns comprising 12 Resource Elements (REs) may be used, as represented by either the 12 dark shaded REs (REs 111) or the 12 light shaded REs (REs 112) of FIGS. 1A-1C. The particular DM-RS patterns used may be optimized for specific scenarios (e.g., the DM-RS pattern provided by REs 111 may be optimized for a first CDM group while the DM-RS pattern provided by REs 112 may be optimized for a second CDM group). For PDSCHs transmitted at MIMO ranks above 2, DM-RS patterns comprising 24 REs may be used, as represented by the 24 REs of both the dark and light shaded REs (REs 111 and 112). It should be appreciated that other resource elements of these frames may be occupied by other signals, such as Common Reference Signals (CRSS), also referred as cell-specific reference signals, as represented by the cross-hatched REs in FIGS. 1A-1C.

In addition to the different patterns and number of REs that may be utilized, DM-RS based PDSCH may further implement different spreading factors (SFs). For example, for PDSCHs transmitted at MIMO rank 4 or below, a spreading factor of 2 (SF2), whereby the DM-RS pattern is spread across 2 consecutive Orthogonal Frequency Division Multiplexing (OFDM) symbols in time, may be used. Whereas, for PDSCHs transmitted at MIMO ranks greater than 4, a spreading factor of 4 (SF4), whereby the DM-RS pattern is spread across 4 OFDM symbols in time in a subframe, may be used.

As can be appreciated from the foregoing, various aspects of the demodulation reference signal are optimized for use with respect to particular communication scenarios. For example, the DM-RS pattern, number or REs utilized, and the spreading factor implemented, may be varied depending upon such considerations as the MIMO rank, the CMD groupings, etc. Depending upon the particular demodulation reference signal configuration utilized, an appreciable amount of the otherwise available communication bandwidth may be consumed with this reference signal overhead.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

For example, LTE releases 8-10 provide for utilization of 1 of 7 possible time division duplex (TDD) downlink/uplink subframe configurations, as shown in the table below wherein a subframe designated with a D is a downlink subframe, a subframe designated with a U is an uplink subframe, and a subframe designated with a S is a special subframe (special subframes having a downlink portion for control, and possibly data, and an uplink portion for channel sounding, and possibly random access preamble transmission). Selection of a particular subframe configuration in accordance with LTE releases 8-10 is relatively static, and thus tends to remain the same once selected for hours and even days. However, there is ongoing discussion with respect to the development of LTE release 11 to potentially provide for dynamically adapting the TDD downlink/uplink subframe configurations.

Uplink-downlink configurations.

| Uplink-downlink configuration | Downlink-to-Uplink Switch-point periodicity | Subframe number | | | | | | | | | |
|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In developing LTE release 11, the possibility of providing dynamic selection of the TDD downlink/uplink subframe configuration based upon actual traffic needs is being explored. For example, if during a short duration a large data burst on downlink is needed, the TDD downlink/uplink configuration may be changed from a relatively symmetric downlink/uplink configuration (e.g., configuration 1 providing 6 DL slots and 4 UL slots) to a downlink/uplink configuration favoring the downlink (e.g., configuration 5 providing 9 DL slots and 1 UL slot). Such dynamic adaptation of the downlink/uplink configurations may, however, result in increased interference to both downlink and uplink, such as when two or more cells have different downlink and uplink subframe configurations. Moreover, the changes in downlink/uplink configuration, and thus the interference introduced thereby, may occur rapidly. For example, the adaptation of the TDD downlink/uplink configuration is expected to be no slower than 640 ms, but may occur as quickly as 10 ms.

With the demand for mobile broadband access continuing to increase, it is expected that future wireless networks will comprise more densely deployed nodes (e.g., basestations, access points, etc.). Such wireless network nodes may include high power class nodes, such as to provide wireless communication coverage of relatively large areas, and low power class nodes, such as to provide throughput reachability and/or throughput enhancement. For example, low power class nodes may be deployed in the wireless network to provide increased throughput in a heavy traffic area, to enable high bandwidth wireless communications in an area unserved by high power class nodes, etc.

The low power class nodes of a wireless network may comprise planned and/or unplanned deployments, may comprise fixed locations and/or dynamic locations (e.g., UE relays), etc. Nevertheless, it is expected that the low power class nodes will serve a limited number of UEs, in contrast to traditional macro nodes (high power class nodes) where each node typically serves a larger number of UEs. For example, in an extreme case, a low power class node may serve a single UE for some duration.

Such low power class nodes may provide deployments which are more near the served UEs. Moreover, due to their serving fewer UEs, the number of activities being scheduled by these particular nodes is limited. Accordingly, it is expected that the channel condition between the low power class node and the served UEs will be more favorable, as compared to the channel condition between typical high power class nodes and their served UEs. For example, the channel condition between a low power class node and its served UEs may be slow time-varying, have a small multi-path delay profile, provide a high signal to noise ratio (SNR), etc.

It should be appreciated that the aforementioned DM-RS patterns generally in use today are adapted for use with respect to the typical high power class nodes. Due to more favorable channel conditions expected to be associated with the low power class nodes, as well as the expectation of very limited number of UEs served by a node, the above DM-RS patterns are not optimized for use with respect to many instances of low power class nodes. A possibility of reducing control and reference signal overhead is therefore presented. If achieved, a reduction in control and reference signal overhead may facilitate the allocation of more resources to actual data transmissions in the wireless network. However, techniques for reducing control and reference signal overhead should balance the reduction in overhead with any resulting impact on data channel decoding, such that overall system performance gain can be achieved. In particular, a balance between the reference signal used and the corresponding data to be demodulated using the reference signal should be struck for proper estimation of the condition of the channel, channel information, timing information, etc. in order to reliably demodulate the data.

Although the opportunity exists for reducing reference signal overhead in the more favorable channel conditions expected with low power class nodes, the channels associated with these nodes may nevertheless be slow time-varying. Accordingly, the use of reference signal overhead reduction techniques may result in some undesired impact on data decoding. Moreover, although a channel may be slow time-varying, interference may vary considerably from subframe to subframe, particularly if the dynamic selection of the TDD downlink/uplink subframe configurations proposed with respect to LTE release 11 are implemented. Therefore, some techniques for reducing reference signal overhead may not be acceptable in the interference environment presented. Also the impact on Hybrid Automatic Repeat Request (HARQ) operation, whether known or unknown, by a reference signal overhead reduction technique may render the technique undesirable.

SUMMARY

In one aspect of the disclosure, methods of wireless communication is provided. The method may comprise determining if a reference signal (RS) frequency-domain bundling pattern providing reduced overhead is to be used for at least one channel, and communicating with a wireless node using the at least one channel based on the RS frequency-domain bundling pattern with reduced overhead.

In an additional aspect of the disclosure, the method of wireless communication may comprise determining if a reference signal (RS) time-domain bundling pattern providing reduced overhead is to be used for at least one channel, wherein the RS time-domain bundling pattern includes a restriction with respect to a position of a reference signal presence in resource blocks of the time-domain bundle, and communicating with a wireless node using the at least one channel based on the RS time-domain bundling pattern with reduced overhead.

In another additional aspect of the disclosure, the method of wireless communication may comprise determining if a reference signal (RS) code-domain reduction pattern providing reduced overhead is to be used for at least one channel, and communicating with a wireless node using the at least one channel based on the RS code-domain reduction pattern with reduced overhead.

In still another additional aspect of the disclosure, the method of wireless communication may comprise determining if a reference signal (RS) timing-domain reduction pattern providing reduced overhead is to be used for at least one channel, and communicating with a wireless node using the at least one channel based on the RS timing-domain reduction pattern with reduced overhead.

In yet another additional aspect of the disclosure, the method of wireless communication may comprise determining if a reference signal (RS) frequency-domain reduction pattern providing reduced overhead is to be used for at least one channel, and communicating with a wireless node using the at least one channel based on the RS frequency-domain reduction pattern with reduced overhead.

In one aspect of the disclosure, computer program products for wireless communications in a wireless network are provided. The computer program product may comprise a non-transitory computer-readable medium having program code recorded thereon. The program code may include program code to determine if a reference signal (RS) frequency-domain bundling pattern providing reduced overhead is to be used for at least one channel, and program code to communicate with a wireless node using the at least one channel based on the RS frequency-domain bundling pattern with reduced overhead.

In an additional aspect of the disclosure, the program code may include program code to determine if a reference signal (RS) time-domain bundling pattern providing reduced overhead is to be used for at least one channel, wherein the RS time-domain bundling pattern includes a restriction with respect to a position of a reference signal presence in resource blocks of the time-domain bundle, and program code to communicate with a wireless node using the at least one channel based on the RS time-domain bundling pattern with reduced overhead.

In another additional aspect of the disclosure, the program code may include program code to determine if a reference signal (RS) code-domain reduction pattern providing reduced overhead is to be used for at least one channel, and program code to communicate with a wireless node using the at least one channel based on the RS code-domain reduction pattern with reduced overhead.

In still another additional aspect of the disclosure, the program code may include program code to determine if a reference signal (RS) timing-domain reduction pattern providing reduced overhead is to be used for at least one channel, and program code to communicate with a wireless node using the at least one channel based on the RS timing-domain reduction pattern with reduced overhead.

In yet another additional aspect of the disclosure, the program code may include program code to determine if a reference signal (RS) frequency-domain reduction pattern providing reduced overhead is to be used for at least one channel, and program code to communicate with a wireless node using the at least one channel based on the RS frequency-domain reduction pattern with reduced overhead.

In one aspect of the disclosure, an apparatus configured for wireless communication is provided. The apparatus may comprise means for determining if a reference signal (RS) frequency-domain bundling pattern providing reduced overhead is to be used for at least one channel, and means for communicating with a wireless node using the at least one channel based on the RS frequency-domain bundling pattern with reduced overhead.

In an additional aspect of the disclosure, the apparatus may comprise means for determining if a reference signal (RS) time-domain bundling pattern providing reduced overhead is to be used for at least one channel, wherein the RS time-domain bundling pattern includes a restriction with respect to a position of a reference signal presence in resource blocks of the time-domain bundle, and means for communicating with a wireless node using the at least one channel based on the RS time-domain bundling pattern with reduced overhead.

In another additional aspect of the disclosure, the apparatus may comprise means for determining if a reference signal (RS) code-domain reduction pattern providing reduced overhead is to be used for at least one channel, and means for communicating with a wireless node using the at least one channel based on the RS code-domain reduction pattern with reduced overhead.

In still another additional aspect of the disclosure, the apparatus may comprise means for determining if a reference signal (RS) timing-domain reduction pattern providing reduced overhead is to be used for at least one channel, and means for communicating with a wireless node using the at least one channel based on the RS timing-domain reduction pattern with reduced overhead.

In yet another additional aspect of the disclosure, the apparatus may comprise means for determining if a reference signal (RS) frequency-domain reduction pattern providing reduced overhead is to be used for at least one channel, and means for communicating with a wireless node using the at least one channel based on the RS frequency-domain reduction pattern with reduced overhead.

In one aspect of the disclosure, an apparatus includes at least one processor and a memory coupled to the processor. The processor may be configured to determine if a reference signal (RS) frequency-domain bundling pattern providing reduced overhead is to be used for at least one channel, and to communicate with a wireless node using the at least one channel based on the RS frequency-domain bundling pattern with reduced overhead.

In an additional aspect of the disclosure the processor may be configured to determine if a reference signal (RS) time-domain bundling pattern providing reduced overhead is to be used for at least one channel, wherein the RS time-domain bundling pattern includes a restriction with respect to a position of a reference signal presence in resource blocks of the time-domain bundle, and to communicate with a wireless node using the at least one channel based on the RS time-domain bundling pattern with reduced overhead.

In another additional aspect of the disclosure the processor may be configured to determine if a reference signal (RS) code-domain reduction pattern providing reduced overhead is to be used for at least one channel, and to communicate with a wireless node using the at least one channel based on the RS code-domain reduction pattern with reduced overhead.

In still another additional aspect of the disclosure the processor may be configured to determine if a reference signal (RS) timing-domain reduction pattern providing reduced overhead is to be used for at least one channel, and to communicate with a wireless node using the at least one channel based on the RS timing-domain reduction pattern with reduced overhead.

In yet another additional aspect of the disclosure the processor may be configured to determine if a reference signal (RS) frequency-domain reduction pattern providing reduced overhead is to be used for at least one channel, and to communicate with a wireless node using the at least one channel based on the RS frequency-domain reduction pattern with reduced overhead.

DETAILED DESCRIPTION

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 2:
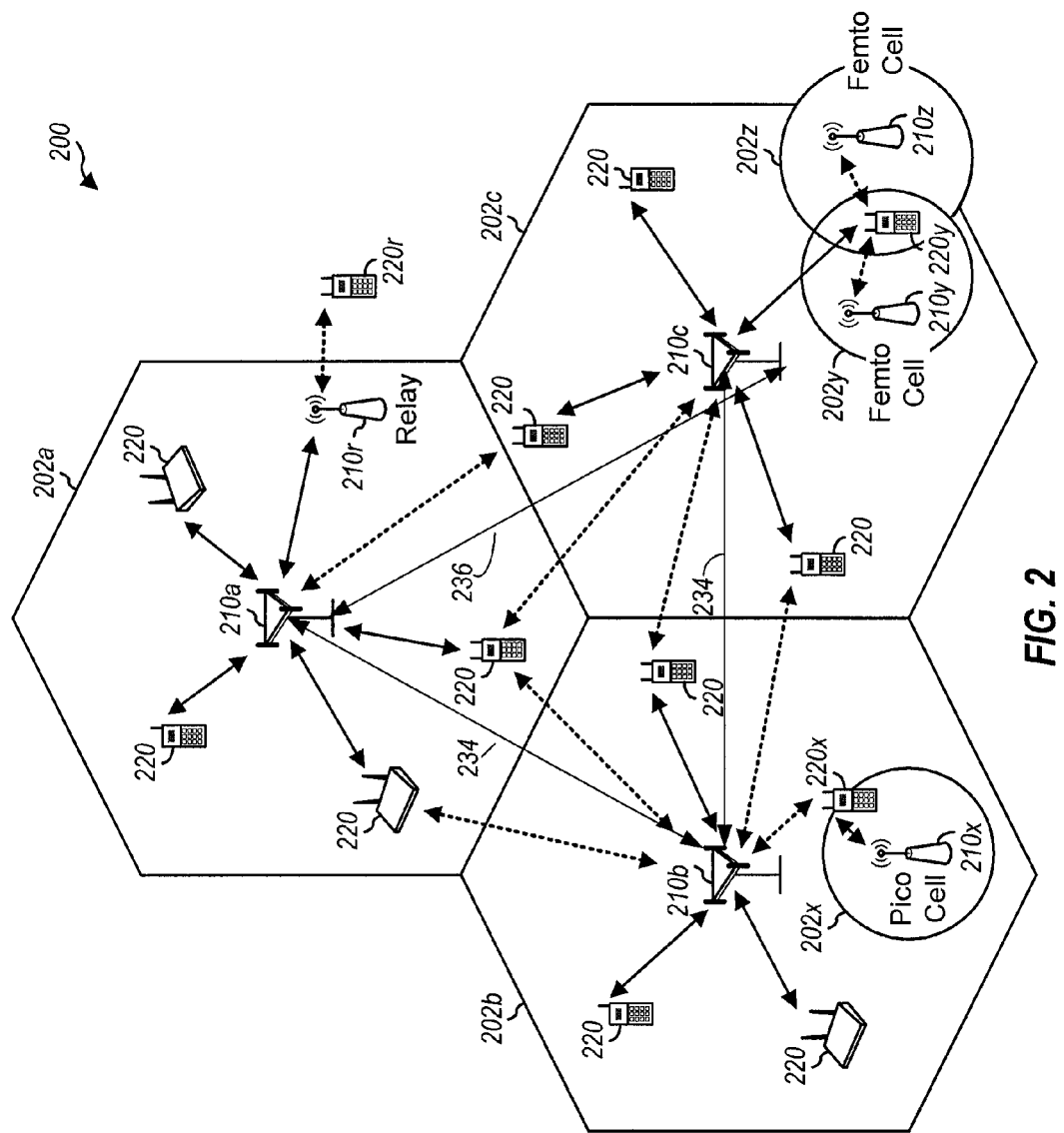
FIG. 2 is a block diagram conceptually illustrating an example of a mobile communication system.

FIG. 2 shows a wireless network 200 for communication, which may be an LTE-A network. Wireless network 200 includes a number of nodes, such as evolved node Bs (eNBs) 210, and other network entities. An eNB may be a station that communicates with the UEs and may also be referred to as a base station, a node B, an access point, and the like. Each eNB 210 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell, which is an example of a high power class node, may be referred to as a macro eNB. An eNB for a pico cell may be referred to as a pico eNB. And, an eNB for a femto cell, which is an example of a low power class node, may be referred to as a femto eNB or a home eNB. In the example shown in FIG. 2, eNBs 210a, 210b and 210c are macro eNBs for macro cells 202a, 202b and 202c, respectively. eNB 210x is a pico eNB for pico cell 202x. And, eNBs 210y and 210z are femto eNBs for femto cells 202y and 202z, respectively. An eNB may support one or multiple (e.g., two, three, four, and the like) cells.

Wireless network 200 also includes relay stations. A relay station is a station that receives a transmission of data and/or other information from an upstream station (e.g., an eNB, a UE, or the like) and sends a transmission of the data and/or other information to a downstream station (e.g., another UE, another eNB, or the like). A relay station may also be a UE that relays transmissions for other UEs. In the example shown in FIG. 2, relay station 210r, which may be another example of a low power class node, may communicate with eNB 210a and UE 220r, in which relay station 210r acts as a relay between the two network elements (eNB 210a and UE 220r) in order to facilitate communication between them. A relay station may also be referred to as a relay eNB, a relay, and the like.

Wireless network 200 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

UEs 220 are dispersed throughout wireless network 200, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like. In FIG. 2, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.25, 2.5, 5, 10 or 20 MHz, respectively.

Figure 3:
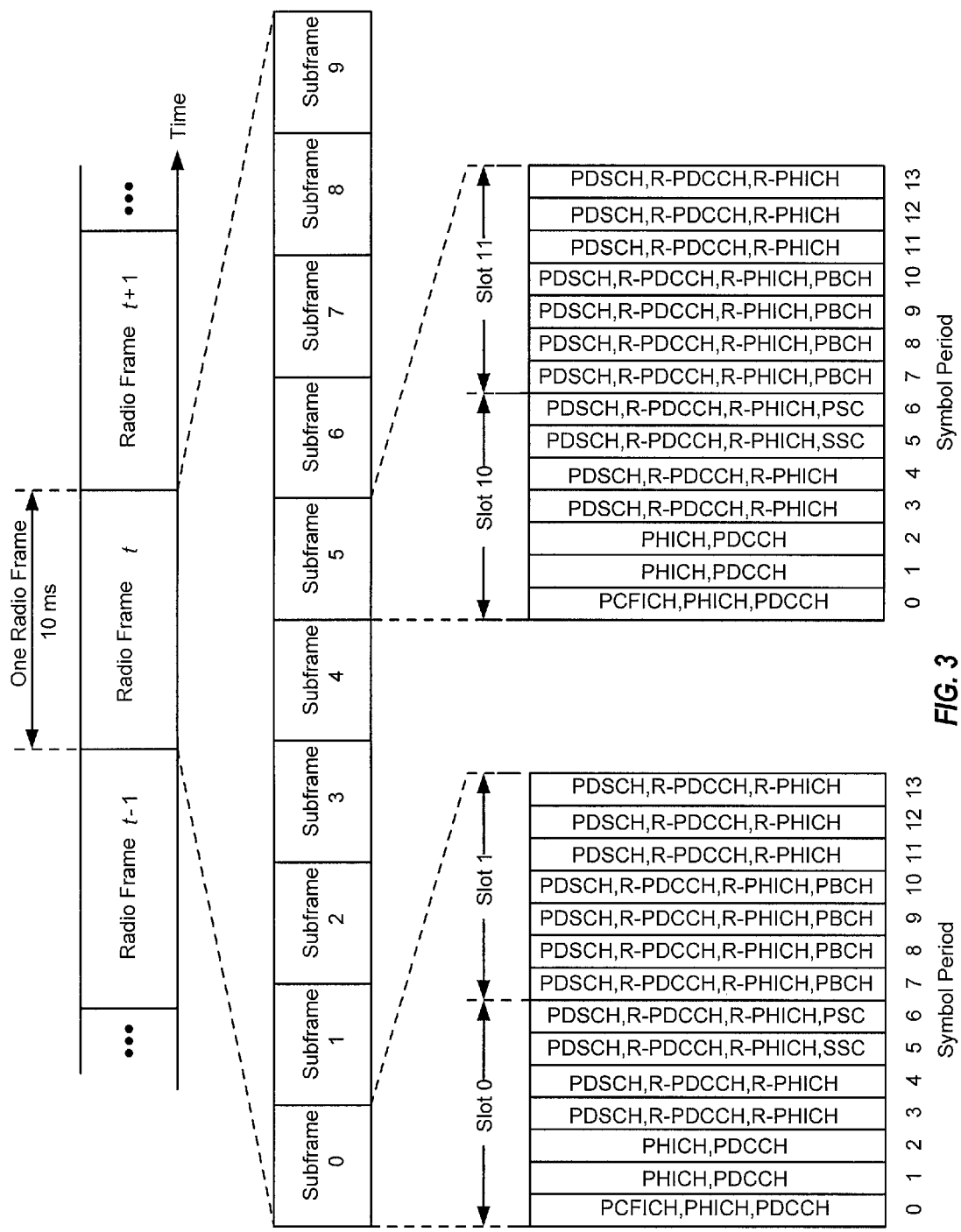
FIG. 3 is a block diagram conceptually illustrating an example of a downlink frame structure in a mobile communication system.

FIG. 3 shows a downlink frame structure used in LTE/-A. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 3) or 6 symbol periods for an extended cyclic prefix. The 2L symbol periods in each subframe may be assigned indices of 0 through 2L−1. The available time frequency resources may be partitioned into resource blocks (RBs). Each resource block may cover N subcarriers (e.g., 12 subcarriers) in one slot.

In LTE/-A, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 3. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as seen in FIG. 3. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 3, M=3. The eNB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 3. The PHICH may carry information to support hybrid automatic retransmission (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

In addition to or in the alternative to sending PHICH and PDCCH in the control section of each subframe, i.e., the first symbol period of each subframe, the LTE-A may also transmit these control-oriented channels in the data portions of each subframe. As shown in FIG. 3, these new control designs utilizing the data region, where there may or may not be a legacy control region (e.g., the Relay-Physical Downlink Control Channel (R-PDCCH) or enhanced PDCCH EPDCCH) and Relay-Physical HARQ Indicator Channel (R-PHICH) or enhanced PHICH (EPHICH) are included in the later symbol periods of each subframe). Similarly, enhanced PCFICH (EPCFICH) may also be present. The R-PDCCH is a new type of control channel utilizing the data region originally developed in the context of half-duplex relay operation. The EPDCCH is also a new type of control channel utilizing the data region. Different from legacy PDCCH and PHICH, which occupy the first several control symbols in one subframe, R-PDCCH, EPDCCH, R-PHICH, EPHICH, and/or EPCFICH are mapped to resource elements (REs) originally designated as the data region. The new control channel may be in the form of Frequency Division Multiplexing (FDM), Time Division Multiplexing (TDM), or a combination of FDM and TDM.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, path loss, signal-to-noise ratio (SNR), etc.

Figure 4:
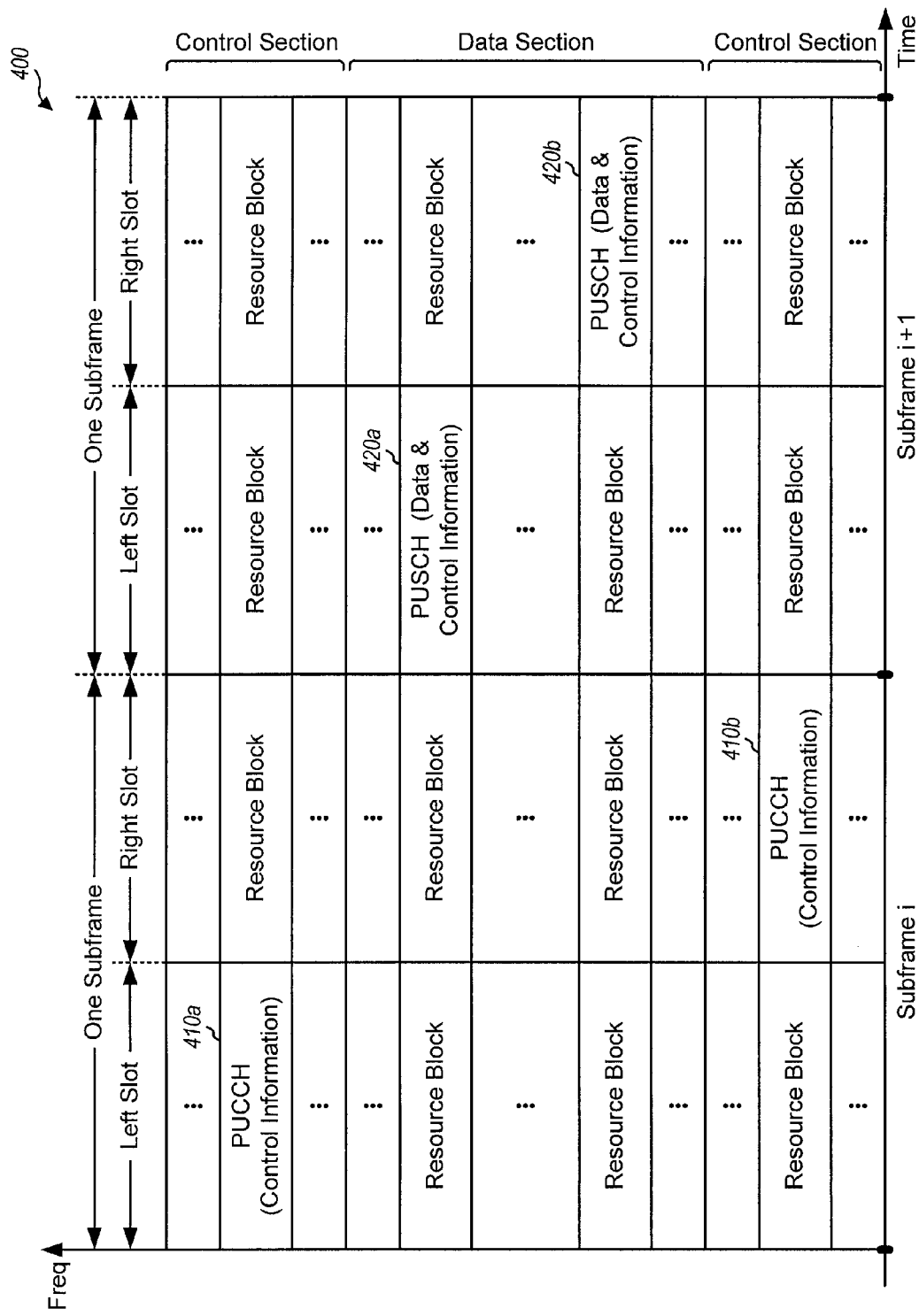
FIG. 4 is a block diagram conceptually illustrating an exemplary frame structure in uplink LTE/-A communications.

FIG. 4 is a block diagram illustrating an exemplary frame structure 400 in uplink long term evolution (LTE/-A) communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 4 results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNode B. The UE may transmit control information in a Physical Uplink Control Channel (PUCCH) on assigned resource blocks 410a and 410b in the control section. The UE may transmit only data or both data and control information in a Physical Uplink Shared Channel (PUSCH) on assigned resource blocks 420a and 420b in the data section. An uplink transmission may span both slots of a subframe and may hop across frequency as shown in FIG. 4.

Referring back to FIG. 2, wireless network 200 uses the diverse set of eNBs 210 (i.e., macro eNBs, pico eNBs, femto eNBs, and relays) to improve the spectral efficiency of the system per unit area. Because wireless network 200 uses such different eNBs for its spectral coverage, it may also be referred to as a heterogeneous network. Macro eNBs 210a-c are usually carefully planned and placed by the provider of wireless network 200. Macro eNBs 210a-c generally transmit at high power levels (e.g., 5 W-40 W). Pico eNB 210x and relay station 210r, which generally transmit at substantially lower power levels (e.g., 100 mW-2 W), may be deployed in a relatively unplanned manner to eliminate coverage holes in the coverage area provided by macro eNBs 210a-c and improve capacity in the hot spots. Femto eNBs 210y-z, which are typically deployed independently from wireless network 200 may, nonetheless, be incorporated into the coverage area of wireless network 200 either as a potential access point to wireless network 200, if authorized by their administrator(s), or at least as an active and aware eNB that may communicate with other eNBs 210 of wireless network 200 to perform resource coordination and coordination of interference management. Femto eNBs 210y-z typically also transmit at substantially lower power levels (e.g., 100 mW-2 W) than macro eNBs 210a-c.

In operation of a heterogeneous network, such as wireless network 200, each UE is usually served by the eNB with the better signal quality, while the unwanted signals received from the other eNBs are treated as interference. While such operational principals can lead to significantly sub-optimal performance, gains in network performance are realized in wireless network 200 by using intelligent resource coordination among eNBs 210, better server selection strategies, and more advanced techniques for efficient interference management.

A pico eNB, such as pico eNB 210x, is characterized by a substantially lower transmit power when compared with a macro eNB, such as macro eNBs 210a-c. A pico eNB will also usually be placed around a network, such as wireless network 200, in an ad hoc manner. Because of this unplanned deployment, wireless networks with pico eNB placements, such as wireless network 200, can be expected to have large areas with low signal to interference conditions, which can make for a more challenging RF environment for control channel transmissions to UEs on the edge of a coverage area or cell (a "cell-edge" UE). Moreover, the potentially large disparity (e.g., approximately 20 dB) between the transmit power levels of macro eNBs 210a-c and pico eNB 210x implies that, in a mixed deployment, the downlink coverage area of pico eNB 210x will be much smaller than that of macro eNBs 210a-c.

In the uplink case, however, the signal strength of the uplink signal is governed by the UE, and, thus, will be similar when received by any type of eNBs 210. With the uplink coverage areas for eNBs 210 being roughly the same or similar, uplink handoff boundaries will be determined based on channel gains. This can lead to a mismatch between downlink handover boundaries and uplink handover boundaries. Without additional network accommodations, the mismatch would make the server selection or the association of UE to eNB more difficult in wireless network 200 than in a macro eNB-only homogeneous network, where the downlink and uplink handover boundaries are more closely matched.

If server selection is based predominantly on downlink received signal strength, the usefulness of mixed eNB deployment of heterogeneous networks, such as wireless network 200, will be greatly diminished. This is because the larger coverage area of the higher powered macro eNBs, such as macro eNBs 210a-c, limits the benefits of splitting the cell coverage with the pico eNBs, such as pico eNB 210x, because, the higher downlink received signal strength of macro eNBs 210a-c will attract all of the available UEs, while pico eNB 210x may not be serving any UE because of its much weaker downlink transmission power. Moreover, macro eNBs 210a-c will likely not have sufficient resources to efficiently serve those UEs. Therefore, wireless network 200 will attempt to actively balance the load between macro eNBs 210a-c and pico eNB 210x by expanding the coverage area of pico eNB 210x. This concept is referred to as cell range extension (CRE).

Wireless network 200 achieves CRE by changing the manner in which server selection is determined. Instead of basing server selection on downlink received signal strength, selection is based more on the quality of the downlink signal. In one such quality-based determination, server selection may be based on determining the eNB that offers the minimum path loss to the UE. Additionally, wireless network 200 provides a fixed partitioning of resources between macro eNBs 210a-c and pico eNB 210x. However, even with this active balancing of load, downlink interference from macro eNBs 210a-c should be mitigated for the UEs served by the pico eNBs, such as pico eNB 210x. This can be accomplished by various methods, including interference cancellation at the UE, resource coordination among eNBs 210, or the like.

In a heterogeneous network with cell range extension, such as wireless network 200, in order for UEs to obtain service from the lower-powered eNBs, such as pico eNB 210x, in the presence of the stronger downlink signals transmitted from the higher-powered eNBs, such as macro eNBs 210a-c, pico eNB 210x engages in control channel and data channel interference coordination with the dominant interfering ones of macro eNBs 210a-c. Many different techniques for interference coordination may be employed to manage interference. For example, inter-cell interference coordination (ICIC) may be used to reduce interference from cells in co-channel deployment. One ICIC mechanism is adaptive resource partitioning. Adaptive resource partitioning assigns subframes to certain eNBs. In subframes assigned to a first eNB, neighbor eNBs do not transmit. Thus, interference experienced by a UE served by the first eNB is reduced. Subframe assignment may be performed on both the uplink and downlink channels.

For example, subframes may be allocated between three classes of subframes: protected subframes (U subframes), prohibited subframes (N subframes), and common subframes (C subframes). Protected subframes are assigned to a first eNB for use exclusively by the first eNB. Protected subframes may also be referred to as "clean" subframes based on the lack of interference from neighboring eNBs. Prohibited subframes are subframes assigned to a neighbor eNB, and the first eNB is prohibited from transmitting data during the prohibited subframes. For example, a prohibited subframe of the first eNB may correspond to a protected subframe of a second interfering eNB. Thus, the first eNB is the only eNB transmitting data during the first eNB's protected subframe. Common subframes may be used for data transmission by multiple eNBs. Common subframes may also be referred to as "unclean" subframes because of the possibility of interference from other eNBs.

At least one protected subframe is statically assigned per period. In some cases only one protected subframe is statically assigned. For example, if a period is 8 milliseconds, one protected subframe may be statically assigned to an eNB during every 8 milliseconds. Other subframes may be dynamically allocated.

Adaptive resource partitioning information (ARPI) allows the non-statically assigned subframes to be dynamically allocated. Any of protected, prohibited, or common subframes may be dynamically allocated (AU, AN, AC subframes, respectively). The dynamic assignments may change quickly, such as, for example, every one hundred milliseconds or less.

Heterogeneous networks may have eNBs of different power classes. For example, three power classes may be defined, in decreasing power class, as macro eNBs, pico eNBs, and femto eNBs. When macro eNBs, pico eNBs, and femto eNBs are in a co-channel deployment, the power spectral density (PSD) of the macro eNB (aggressor eNB) may be larger than the PSD of the pico eNB and the femto eNB (victim eNBs) creating large amounts of interference with the pico eNB and the femto eNB. Protected subframes may be used to reduce or minimize interference with the pico eNBs and femto eNBs. That is, a protected subframe may be scheduled for the victim eNB to correspond with a prohibited subframe on the aggressor eNB.

Figure 5:
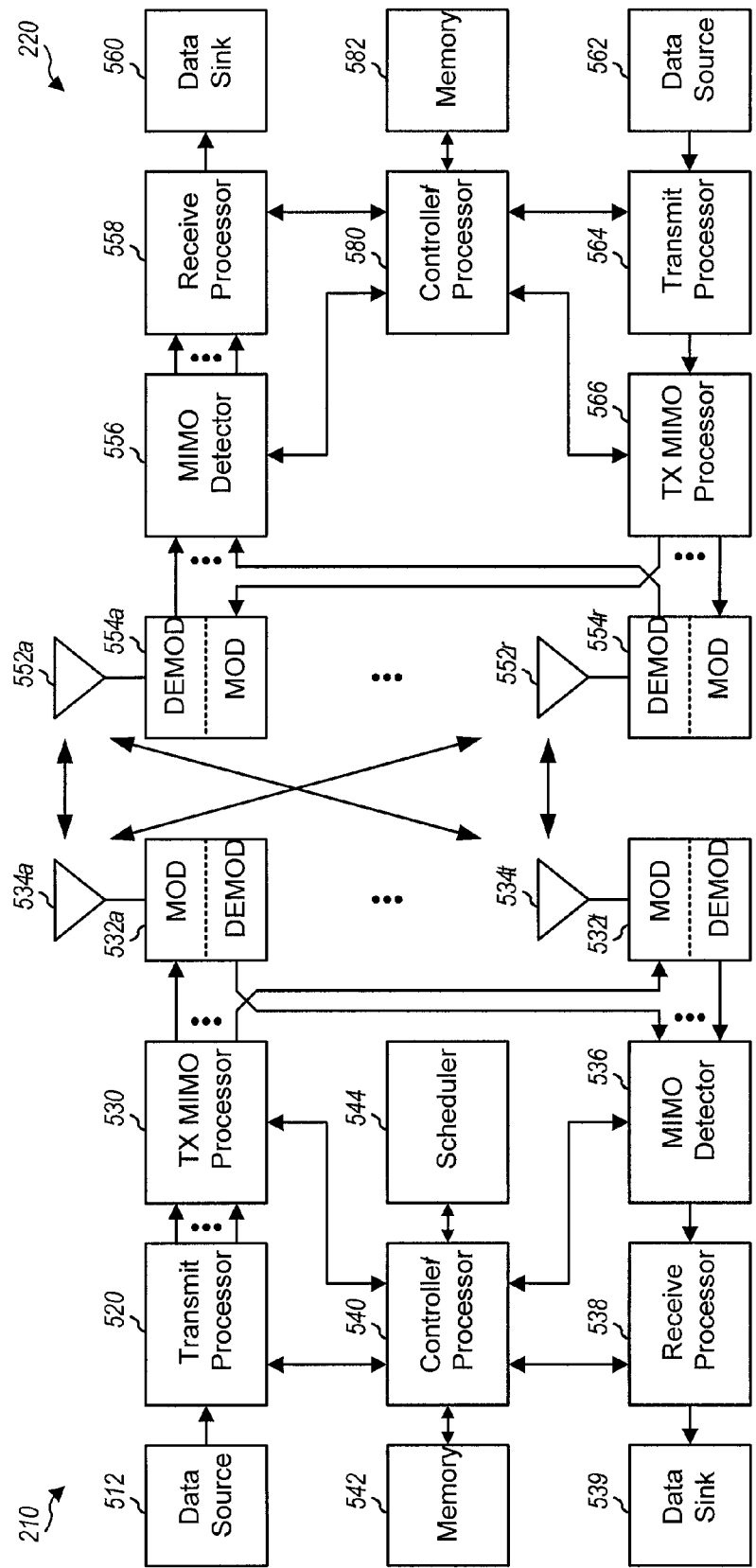
FIG. 5 is a block diagram conceptually illustrating a design of a base station/eNB and a UE configured according to one aspect of the present disclosure.

FIG. 5 shows a block diagram of a design of a node (e.g., base station/eNB 210 of FIG. 2) and a UE (e.g., UE 220 of FIG. 2). As shown in the illustrated embodiment, eNB 210 may be equipped with antennas 534a through 534t, and UE 220 may be equipped with antennas 552a through 552r.

At eNB 210, transmit processor 520 may receive data from data source 512 and control information from controller/processor 540. The control information may be for the PBCH, PCFICH, PHICH, PDCCH, etc. The data may be for the PDSCH, etc. Transmit processor 520 may process (e.g., encode and symbol map) the data and control information to obtain data symbols and control symbols, respectively. Transmit processor 520 may also generate reference symbols, e.g., for the PSS, SSS, and cell-specific reference signal. Transmit (TX) multiple-input multiple-output (MIMO) processor 530 may perform spatial processing (e.g., precoding) on the data symbols, the control symbols, and/or the reference symbols, if applicable, and may provide output symbol streams to modulators (MODS) 532a through 532t. Each modulator 532 may process a respective output symbol stream (e.g., for OFDM, etc.) to obtain an output sample stream. Each modulator 532 may further process (e.g., convert to analog, amplify, filter, and upconvert) the output sample stream to obtain a downlink signal. Downlink signals from modulators 532a through 532t may be transmitted via antennas 534a through 534t, respectively.

At UE 220, antennas 552a through 552r may receive the downlink signals from eNB 210 and may provide received signals to demodulators (DEMODs) 554a through 554r, respectively. Each demodulator 554 may condition (e.g., filter, amplify, downconvert, and digitize) a respective received signal to obtain input samples. Each demodulator 554 may further process the input samples (e.g., for OFDM, etc.) to obtain received symbols. MIMO detector 556 may obtain received symbols from all demodulators 554a through 554r, perform MIMO detection on the received symbols if applicable, and provide detected symbols. Receive processor 558 may process (e.g., demodulate, deinterleave, and decode) the detected symbols, provide decoded data for UE 220 to data sink 560, and provide decoded control information to controller/processor 580.

On the uplink, at UE 220, transmit processor 564 may receive and process data (e.g., for the PUSCH) from data source 562 and control information (e.g., for the PUCCH) from controller/processor 580. Transmit processor 564 may also generate reference symbols for a reference signal. The symbols from transmit processor 564 may be precoded by TX MIMO processor 566 if applicable, further processed by demodulators 554a through 554r (e.g., for SC-FDM, etc.), and transmitted to eNB 210. At eNB 210, the uplink signals from UE 220 may be received by antennas 534, processed by modulators 532, detected by MIMO detector 536 if applicable, and further processed by receive processor 538 to obtain decoded data and control information sent by UE 220. Processor 538 may provide the decoded data to data sink 539 and the decoded control information to controller/processor 540.

Controllers/processors 540 and 580 may direct the operation at eNB 210 and UE 220, respectively. Controller/processor 540 and/or other processors and modules at eNB 210 may perform or direct the execution of various processes for the techniques described herein. Controllers/processor 580 and/or other processors and modules at UE 220 may also perform or direct the execution of various processes for the techniques described herein. Memories 542 and 582 may store data and program codes for eNB 210 and UE 220, respectively. Scheduler 544 may schedule UEs for data transmission on the downlink and/or uplink.

Embodiments of the disclosure herein leverage the more favorable channel conditions expected to be associated with low power class nodes (e.g., eNB210y of FIG. 2), as well as the expectation of very limited number of UEs served by a node, to provide techniques in which the control and/or reference signal overhead may be reduced and yet reliable demodulation of the transmitted data is provided. For example, embodiments herein provide enhancements with respect to the aforementioned time-domain bundling techniques to minimize the impact upon HARQ processing.

Figure 6:
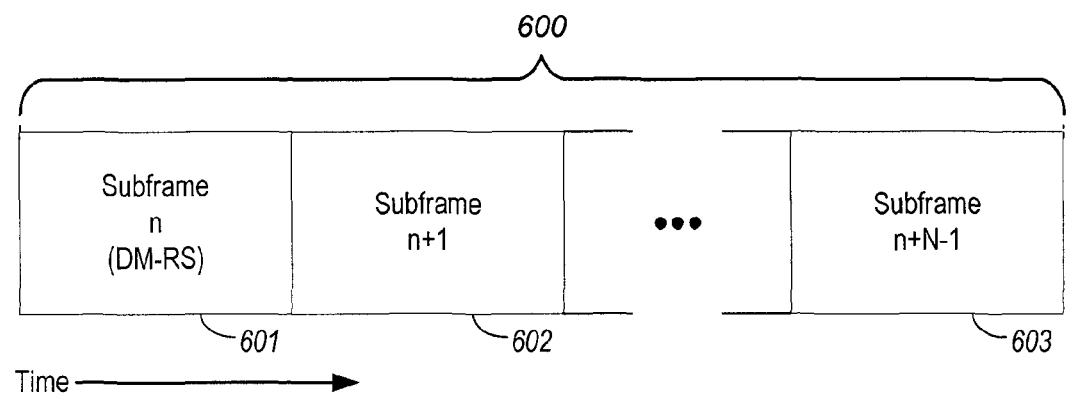
FIG. 6 is a block diagram conceptually illustrating an example of time-domain bundling techniques in accordance with the concepts herein.

In order to minimize the impact on HARQ processing, time-domain bundling techniques of embodiments herein provide a DM-RS slot used by multiple subframes in the first subframe of the bundle. Assume, for example, time-domain a bundling window (e.g., bundling window 600 of FIG. 6) of size N comprising subframes n to subframe m (represented as subframes 601-603 in FIG. 6). In a FDD implementation these subframes may be consecutive, such that the subframes are n, n+1, . . . , n+N−1. However, for a TDD implementation these subframes may not be consecutive in time, since not every subframe is a downlink subframe (as shown in the table above).

It should be appreciated that in FDD wireless communications a time budget may be imposed with respect to acknowledged (ACK) and not acknowledged (NAK) responses (e.g., 4 ms ACK/NAK fixed time budget in LTE implementations). If, however, DM-RS presence is not provided until a second or subsequent subframe, demodulation of an earlier frame would be delayed until receipt of the subsequent subframe having the DM-RS presence, thereby delaying the ACK/NAK for the earlier frame (e.g., even where a time-domain bundling window of only 2 subframes is used, the additional delay introduced by the time-domain bundling may challenge the time gap allowed between a PDSCH transmission and the corresponding ACK/NAK response by the UE in LTE implementations). Accordingly, in operation of a time-domain bundling technique according to embodiments herein with respect to FDD, the presence of DM-RS is required in the first subframe of the time-domain bundle (i.e., subframe 601), although DM-RS may also be present in additional subframes of the time-domain bundle. With this restriction upon DM-RS presence, the decoding of the PDSCH can still be performed on a per subframe basis, thereby minimizing the impact upon HARQ processing.

The time budget for ACK/NAK responses in TDD wireless communications may not be as short as that of FDD wireless communications, due to the need to accommodate non-contiguous downlink/uplink subframes. Thus, time-domain bundling techniques implemented with respect to TDD wireless communications may have the DM-RS presence in the second or subsequent subframe (i.e., subframes 602 or 603) and result in minimal impact upon HARQ processing. In particular, the DM-RS presence in a TDD implementation can be relaxed to a subframe at or before subframe n+k−4, where n+k is the subframe carrying ACK/NAK for subframe n (assuming a minimum 4 ms delay between PDSCH and its corresponding ACK/NAK response. Nevertheless, operation of a time-domain bundling technique according to embodiments herein with respect to TDD also requires the presence of DM-RS in the first subframe of the time-domain bundle (i.e., subframe 601). With this restriction upon DM-RS presence, minimal impact on HARQ may be ensured. Additionally, a UE does not have to decode two or more unicast PDSCHs in one subframe due to time-domain bundling. Moreover, reordering of subframes by the recipient may be accommodated without delay in decoding or resulting in decoding of two or more PDSCHs in one subframe.

Embodiments may additionally or alternatively provide restrictions with respect to the size of the time-domain bundling. For example, the size of a time-domain bundle used with respect to a particular channel may be restricted based upon the interference profile experienced and/or expected for that channel (i.e., although the coherence bandwidth may be favorable to implementation of time-domain bundling for overhead reduction, the interference profile may provide time varied change suggesting a longer or shorter bundling size for facilitating reliable data decoding). Accordingly, the size of the time-domain bundling of embodiments may be fixed (e.g., tied to a TDD mode), semi-statically configurable (e.g., configured via Radio Resource Control (RRC)), and/or dynamically indicated (e.g., indicated via PDCCH). Where time-domain bundling sizes are configurable, a PDCCH or other control channel may provide information indicating the particular time-domain bundling size implemented. In some embodiments herein, the time-domain bundling size (e.g., the precoding subframe group size) may be the same for channel estimation and interference estimation. Alternatively, a first time-domain bundling size may be applied for channel estimation, and a second time-domain bundling size, different from the first one, may be applied for interference estimation. In operation, an indication of the time-domain bundling size(s) may be provided to a UE and/or a UE may determine the corresponding time-domain bundling size(s) for channel estimation and interference estimation.

Figure 7:
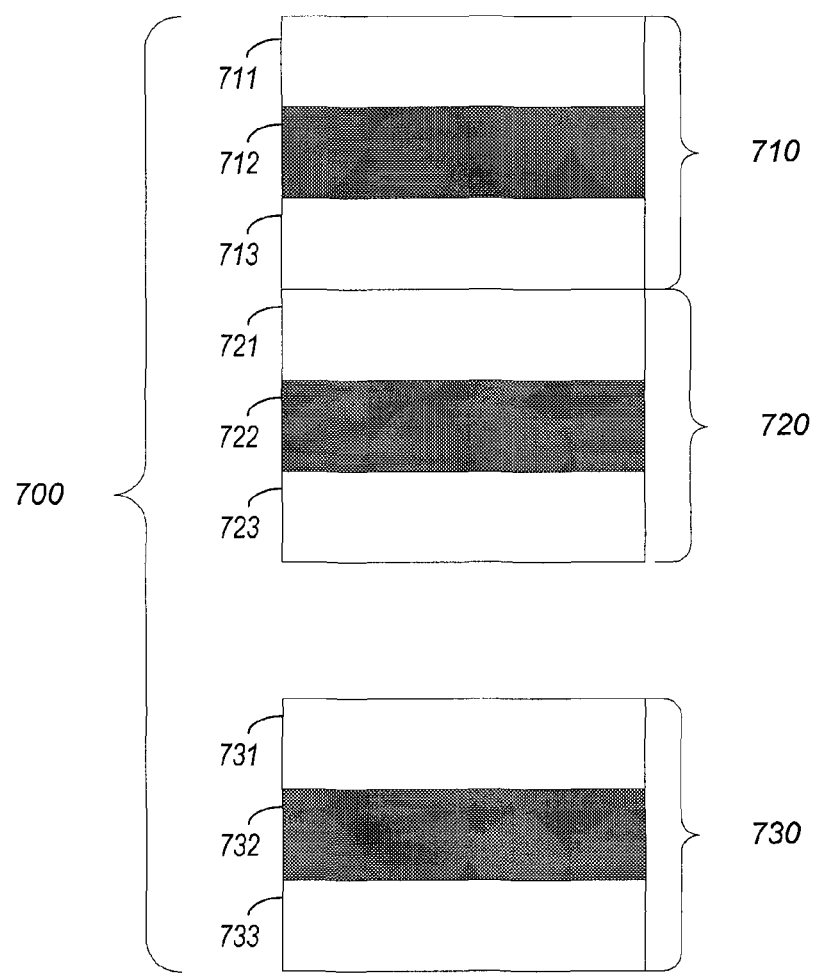
FIG. 7 is a block diagram conceptually illustrating an example of frequency-domain bundling techniques in accordance with the concepts herein.

A further example of a way in which embodiments of the disclosure herein leverage the more favorable channel conditions expected to be associated with low power class nodes (e.g., eNB210y of FIG. 2) to provide techniques in which the control and/or reference signal overhead may be reduced and yet reliable demodulation of the transmitted data is provided is shown in FIG. 7. Under the favorable channel conditions associated with the aforementioned low power class nodes, it is expected the multi-path delay is small, such that coherence bandwidth is large. In particular, with slow time-varying channels, having potentially time-varying interference, and large coherence bandwidth, DM-RS presence may be omitted from some resource blocks of a Physical Resource Block (PRB) pair assigned to a PDSCH. In particular, it is expected that differences in the interference from one RB to another RB in the frequency domain will not be great and the coherent bandwidth will be quite large. Accordingly, in operation according to embodiments herein the DM-RS present in one resource block of a PRB pair can be used for data decoding with respect to another resource block of the PRB pair. That is, embodiments herein do not enforce a dense DM-RS presence in the frequency domain and implement a technique (referred to herein as frequency-domain bundling) for reducing reference signal overhead which bundles a plurality of subframes, in frequency, for using a common or single DM-RS presence for the bundled subframes.

FIG. 7 shows implementation of frequency-domain bundling according to an embodiment herein. In the illustrated embodiment, PDSCH 700 comprises RBs 711-733 (RBs 711-733 are also referred to as PRB pairs, where each PRB may span a slot, and a pair of PRBs span the two slots in a subframe), wherein RBs 711-713 provide RB bundle 710, RBs 721-723 provide RB bundle 720, and RBs 731-733 provide RB bundle 730. As can be appreciated from the embodiment illustrated in FIG. 7, DM-RS presence may be provided in a subset of the RBs of a RB bundle while other RBs of a RB bundle do not include DM-RS presence (e.g., DM-RS presence only in RB 712 of RB bundle 710, DM-RS presence only in RB 722 of RB bundle 720, and DM-RS presence only in RB 732 of RB bundle 730). In operation according to embodiments, the DM-RS present in one RB of a RB bundle can be used for data decoding with respect to another RB of the RB bundle. It should be appreciated that although the illustrated embodiment shows RB bundles utilized according to embodiments herein comprising 3 RBs, RB bundles of any appropriate size may be utilized according to alternative embodiments.

The overhead savings provided by frequency-domain bundling of embodiments depends on the size the frequency-domain bundling (e.g., the number of RBs utilizing a particular DM-RS presence). As one example of the overhead savings provided by implementation of frequency-domain bundling, assume 144 REs per PRB pair, and 24 DM-RS REs, if N=3 (N being the number of RBs per PRB pair) then 48 DM-RS REs can be saved (i.e., 24*2=48 DM-RS REs) in each subframe in which frequency-domain bundling is implemented. Such a savings in overhead use of REs provides a 13.3% increase in the data REs (i.e., 3*(144−24)= 360 and (360+48)=408, or 13.3%). Of course, the use of larger RB bundles, or other frequency-domain bundle grouping, would provide even greater overhead savings.

The size of the frequency-domain bundling can be fixed (e.g., tied to a system bandwidth), semi-statically configurable (e.g., configured via Radio Resource Control (RRC)), and/or dynamically indicated (e.g., indicated via PDCCH). Where frequency-domain bundling sizes are configurable, a PDCCH or other control channel may provide information indicating the particular frequency-domain bundling size implemented.

Within the same frequency-domain bundle, the same precoding (if applied) can be applied to all RBs of the PRB pair(s) in the bundle in accordance with embodiments herein. Accordingly, the frequency-domain bundling size of embodiments is the same as the size of the Precoding RB Groups (PRGs), such as the PRGs defined in LTE release 10. It should be appreciated that PRGs utilized according to embodiments herein may be of any appropriate size, and thus are not limited to the 2 or 3 PRB pairs as specified in LTE release 10. Although implementation of frequency-domain bundling corresponding to PRGs simplifies precoding management with respect to the RBs of the frequency-domain bundles, embodiments herein may also utilize a Precoding Subframe Group (PSG), wherein the same precoding is applied to the DM-RS of the bundled subframes, to better utilize DM-RS across the subframes, as discussed in further detail below. Alternative embodiments may utilize frequency-domain bundling sizes other than the size of the PRGs, such as when large overhead savings are desired. In various embodiments herein, the frequency-domain bundling is dependent upon the system bandwidth (e.g., a 10 MHz system utilizes a first frequency-domain bundling size, a 20 MHz system utilizes a second frequency-domain bundling size, etc.). In some embodiments herein, the frequency-domain bundling size may be the same for channel estimation (e.g., the PRG size) and interference estimation. Alternatively, a first frequency-domain bundling size may be applied for channel estimation, and a second frequency-domain bundling size, different from the first one, may be applied for interference estimation. An indication of the frequency-domain bundling size may be provided to a UE and/or a UE may determine the corresponding frequency-domain bundling size(s) for channel estimation and interference estimation.

The particular RB or RBs utilized in providing DM-RS presence with respect to the RBs of a RB bundle may be selected based upon a number of criteria. The location of the DM-RS presence in the frequency-domain bundle can be fixed (e.g., always in a particular RB position of the PRB pair of the frequency-domain bundle), semi-statically configurable, dynamically indicated, etc. Frequency-domain bundling of embodiments is, in a sense, applying channel estimation for one RB to other RBs of a RB bundle. Accordingly, a criterion for selection of RBs for DM-RS presence, and the corresponding RBs to utilize the DM-RS presence, for frequency-domain bundling may include the proximity in frequency of the RBs. Another criteria for selection of RBs for DM-RS presence, and the corresponding RBs to utilize the DM-RS presence, for frequency-domain bundling may comprise the interference profile experienced and/or expected (e.g., selection of an RB for DM-RS presence may be based upon the RB expected to experience the highest level of interference). In the embodiment illustrated in FIG. 7, DM-RS presence is provided in a RB (RBs 712, 722, and 732) disposed centrally with respect to the other RBs of the RB bundles (RBs 711 and 713 of RB bundle 710, RBs 721 and 723 of RB bundle 720, and RBs 731 and 733 of RB bundle 730), and thus very near in frequency to the RBs utilizing the DM-RS presence (e.g., positioned to absorb general variations across the different RBs utilizing the shared DM-RS presence). Other configurations of DM-RS presence may be utilized according to embodiments. For example, where the coherence bandwidth is determined to be sufficiently large, RB 711 (or RB 713) may be provided with DM-RS presence which is utilized by RBs 712 and 713 (or RBs 711 and 712) of RB bundle 710.

It should be appreciated that the concepts of frequency-domain bundling are not limited to the use of a single RB of a RB bundle, as shown in the embodiment illustrated in FIG. 7. For example, DM-RS presence may be provided in RBs 711 and 713 of RB bundle 710, either or both of which may be utilized by RB 712 in data decoding.

Frequency-domain bundling according to embodiments herein can be implemented with respect to some or all communications of a particular node. For example, implementation of frequency-domain bundling by a particular node may be UE-specific, or for all UEs served by a node. In the case of frequency-domain bundling being implemented for all UEs, the node may broadcast the frequency-domain bundling information (e.g., the size of the frequency-domain bundle, the particular RB position having the DM-RS presence, etc.).

It should be appreciated that the concepts of frequency-domain bundling are not limited to its use with respect to all subframes of a particular communication link. For example, frequency-domain bundling can be implemented for only a subset of subframes for a particular UE rather than for all subframes for the UE. As one example, interference conditions may change from subframe to subframe, such as where time-domain interference coordination is implemented (e.g., some subframes are provided interference protection from neighboring cells), and thus frequency-domain bundling may be implemented for the subframes experiencing the higher interference conditions.

In addition to or in the alternative to implementation of the aforementioned time-domain bundling and frequency-domain bundling techniques, embodiments herein utilize DM-RS pattern adaptation techniques to provide control and/or reference signal overhead reduction. That is the DM-RS patterns utilized may differ from those described above with reference to FIGS. 1A-1C, and as are presently adopted under LTE releases 8-10.

A DM-RS pattern adaptation technique implemented according to embodiments herein provides a DM-RS pattern code-domain reduction. Implementation of DM-RS pattern code-domain reduction facilitates the use of a DM-RS pattern occupying fewer REs than that of a traditional DM-RS pattern through use of a higher CDM spreading factor. Generally, the spreading factor may be increased to provide a tradeoff between overhead savings and limited impact on channel decoding performance, and potentially to accommodate a wider range of ranks for MIMO communications. For example, referring again to FIGS. 1A-1C, in a typical DM-RS pattern implementation, for PDSCHs transmitted at MIMO rank 4, DM-RS patterns comprising 24 REs are used (e.g., the 24 REs of both dark shaded REs 111 and light shaded REs 112) and a spreading factor of 2 (SF2) is used. However, implementation of DM-RS pattern code-domain reduction of embodiments herein leverages the more favorable channel conditions expected to be associated with low power class nodes (e.g., eNB210*y* of FIG. 2) to utilize a spreading factor of 4 (SF4) and only 12 REs (e.g., dark shaded REs 111) with respect to MIMO rank 4 communications, thereby providing a savings of 50% DM-RS overhead. As another example, a spreading factor of 8, over both time-domain and frequency-domain can be used with 12 REs (e.g., dark shaded REs 111) to enable rank 8 MIMO transmissions, thereby providing a savings of 50% DM-RS overhead for the rank 8 case.

Figure 1A:
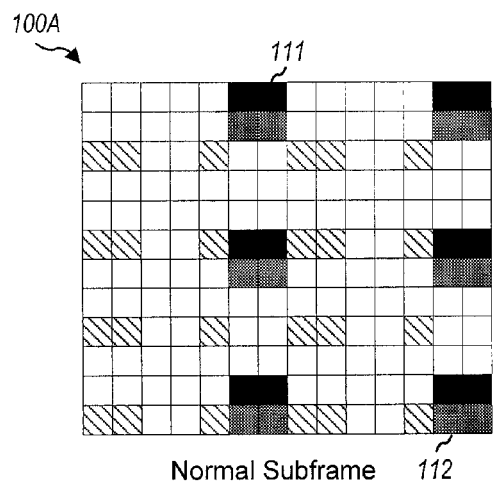
FIGS. 1A-1C are demodulation reference signal patterns as may be used in DM-RS based physical downlink shared channels.
Figure 1B:
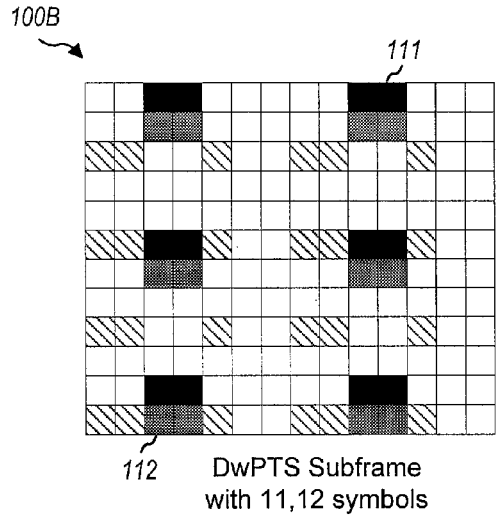
Figure 1C:
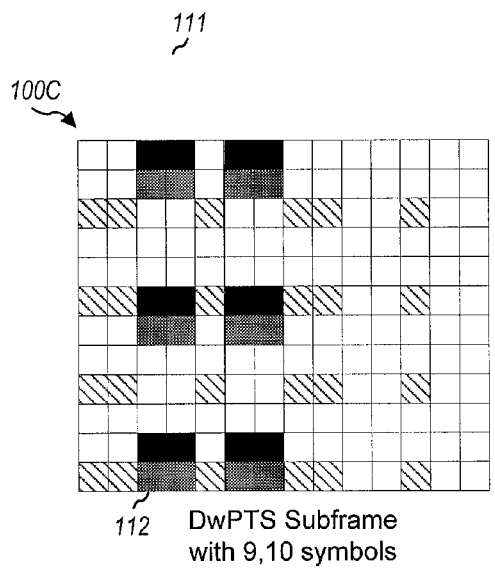
Figure 8A:
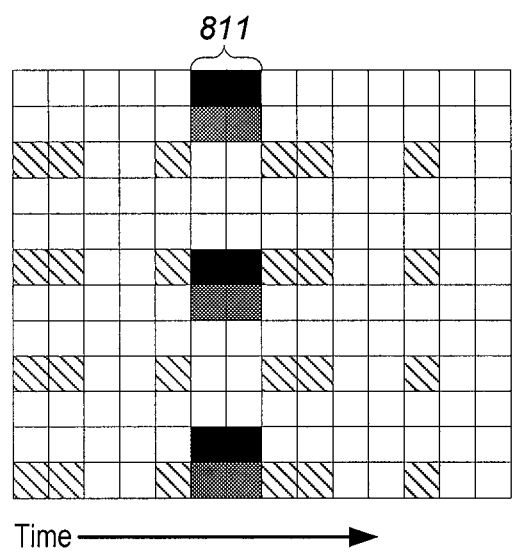
FIGS. 8A-9B are block diagrams conceptually illustrating examples of pattern adaptation techniques in accordance with the concepts herein.

Another DM-RS pattern adaptation technique implemented according to embodiments herein provides a DM-RS pattern timing-domain reduction. Implementation of DM-RS pattern timing-domain reduction facilitates time-domain reduction within a subframe, rather than across subframes as provided by time-domain bundling. DM-RS pattern timing-domain reduction provides for the use of a DM-RS pattern occupying fewer REs than that of a traditional DM-RS pattern through adaptation of the DM-RS pattern in the subframe time domain to thereby utilize fewer columns of REs. Referring again to FIG. 1A, it can be seen that in a normal subframe that for PDSCHs employ 2 strips (each strip comprised of 2 columns) of REs. In implementing DM-RS pattern timing-domain reduction according to embodiments herein, for PDSCHs transmitted up to MIMO rank 4 if a same spreading factor of 2 in time-domain (the 2 columns) is used, the number of RE columns in the DM-RS is reduced (e.g., by half) as shown in FIG. 8A. Higher rank MIMO can be supported if a larger spreading factor (e.g. a spreading factor of 4 over both time-domain and frequency-domain) is used. In the embodiment illustrated in FIG. 8 only one strip (e.g., DM-RS strip 811, comprising 2 adjacent columns of REs) of the 2 strips shown in the corresponding typical configuration of FIG. 1A is used. That is, the REs of the second strip of the DM-RS pattern of FIG. 1A are not utilized in the DM-RS pattern of FIG. 8A wherein DM-RS pattern timing-domain reduction is implemented, thereby providing a savings of 50% DM-RS overhead.

Figure 9A:
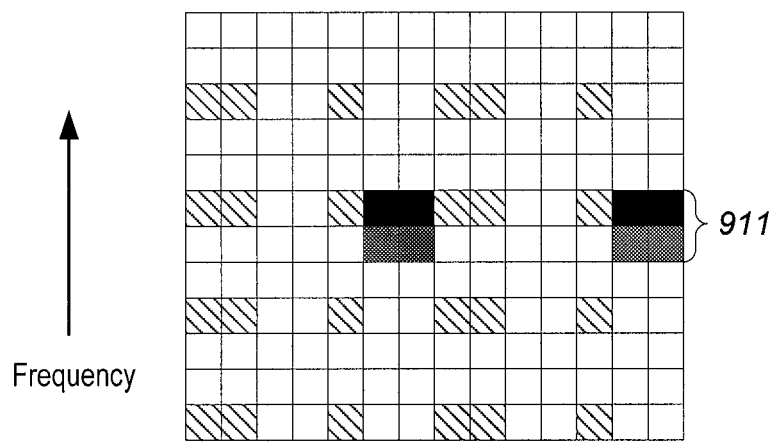

Still another DM-RS pattern adaptation technique implemented according to embodiments herein provides a DM-RS pattern frequency-domain reduction. Implementation of DM-RS pattern frequency-domain reduction facilitates frequency-domain reduction within a RB, rather than across RBs as provided by frequency-domain bundling. DM-RS pattern frequency-domain reduction provides for the use of a DM-RS pattern occupying fewer REs than that of a traditional DM-RS pattern through adaptation of the DM-RS pattern in the subframe frequency domain to thereby utilize fewer columns of REs. Referring again to FIG. 1A, it can be seen that in a normal subframe that for PDSCHs employ 3 stripes (each stripe comprised of either 1 or 2 rows, depending upon the MIMO rank utilized) of REs. In implementing DM-RS pattern frequency-domain reduction according to embodiments herein, the number of RE rows in the DM-RS is reduced (e.g., by two-thirds) as shown in FIG. 9A. Accordingly, in the embodiment illustrated in FIG. 9A only one stripe (e.g., DM-RS stripe 911, comprising 1 or 2 adjacent rows of REs, depending upon the MIMO rank utilized) of the 3 stripes shown in the corresponding typical configuration of FIG. 1A is used. That is, the REs of the first and third stripes of the DM-RS pattern of FIG. 1A are not utilized in the DM-RS pattern of FIG. 9A wherein DM-RS pattern frequency-domain reduction is implemented, thereby providing a savings of 66% DM-RS overhead.

Figure 8B:
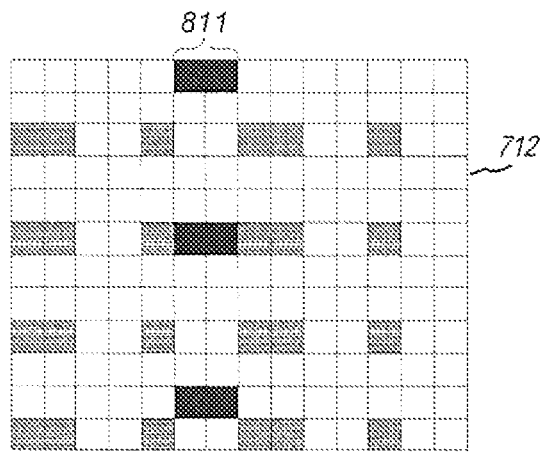
Figure 8B:
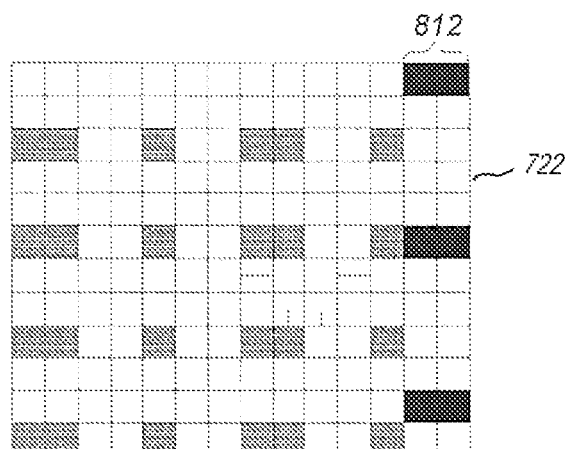
Figure 8B:
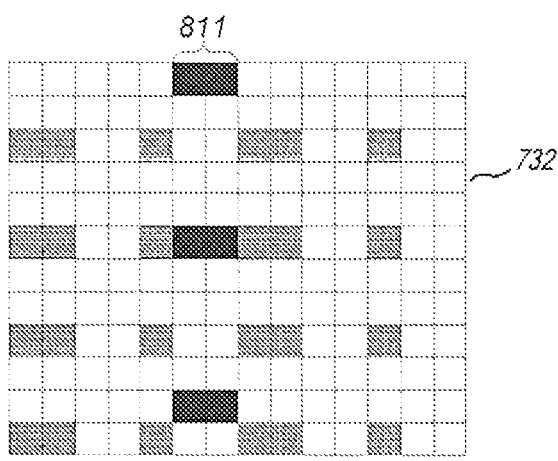
Figure 9B:
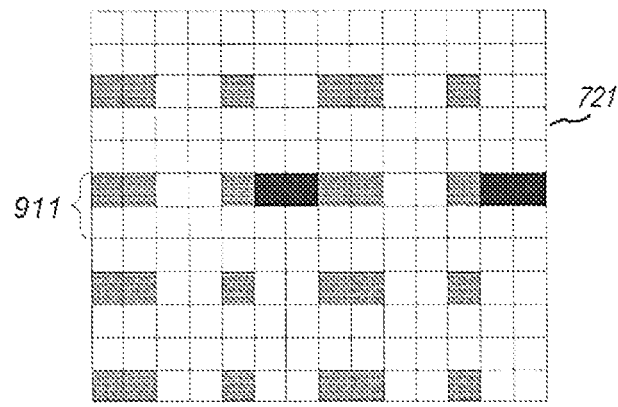
Figure 9B:
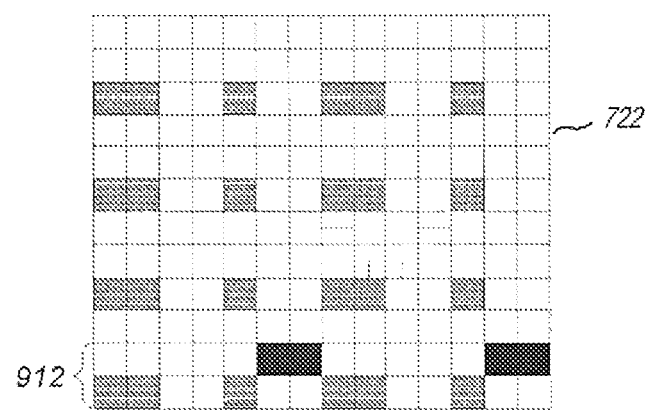
Figure 9B:
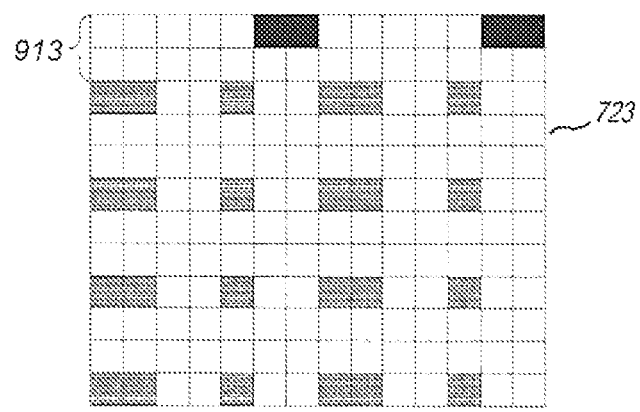

The foregoing DM-RS pattern adaptations may be implemented alone, in combination with each other, and/or in combination with other control and reference signal overhead reduction techniques. For example, one or more DM-RS pattern adaptation technique may be combined with one or more DM-RS bundling technique (e.g., time-domain bundling and/or frequency domain bundling) to provide increased control and/or reference signal overhead reduction according to the concepts herein. The DM-RS pattern adaptations implemented in combination with bundling techniques may be implemented the same or differently in the various PRB pairs of a subframe and/or across subsequent subframes. For example, the particular DM-RS RE column(s) utilized in the PRB pairs of a PDSCH may be different across one or more of the PRB pairs as shown in FIG. 8B, wherein DM-RS strip 811 is utilized in RBs 712 and 732 and DM-RS strip 812 is utilized in RB 722). Similarly, the particular DM-RS RE row(s) utilized in the PRB pairs of a PDSCH may be different across one or more of the PRB pairs as shown in FIG. 9B, wherein DM-RS stripe 911 is utilized in RB 721, DM-RS stripe 912 is utilized in RB 722, and DM-RS stripe 913 is utilized in RB 723.

Figure 10A:
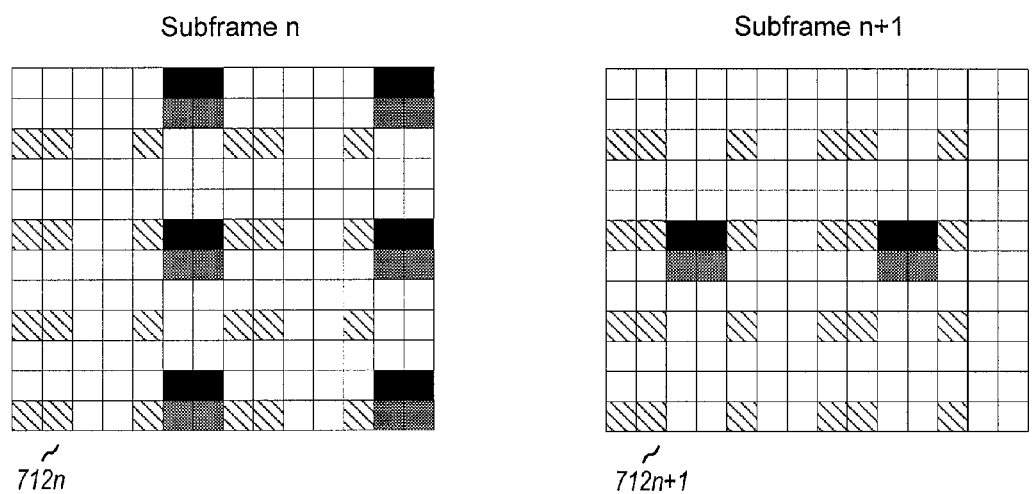
FIGS. 10A and 10B are block diagrams conceptually illustrating examples of subframe dependent variation of overhead reduction in accordance with the concepts herein.
Figure 10B:
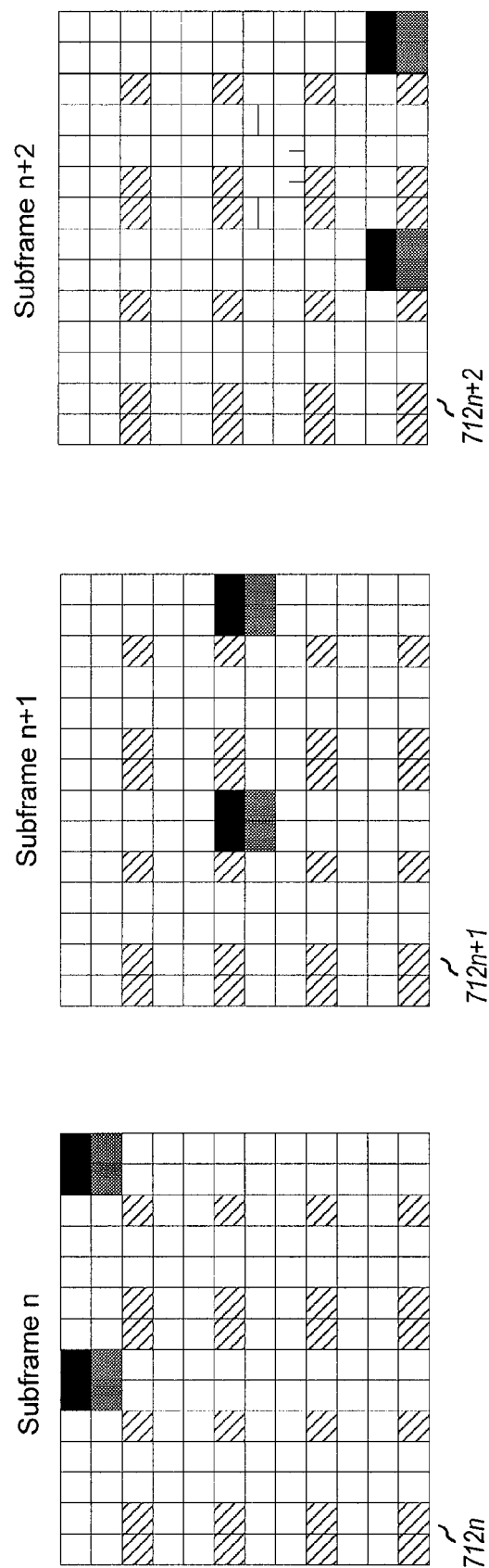

Example of subframe dependent variation of control and reference signal overhead reduction, wherein the DM-RS overhead and/or pattern may change from one subframe to the next, are shown in FIGS. 10A and 10B. In the embodiment illustrated in FIG. 10A, less DM-RS reduction (or possibly no DM-RS reduction) is provided with respect to the RBs of subframe n (including RB 712*n*), whereas more DM-RS reduction (e.g., through application of one of the foregoing techniques) is provided with respect to the RBs of subframe n+1 (including RB 712*n*+1). Such a technique may be particularly useful in situations where the subsequent subframes utilizes not only their own DM-RS, but also the DM-RS of one or more earlier subframes. Although the embodiment illustrated in FIG. 10A shows only 2 different levels of DM-RS reduction, embodiments herein may implement more levels of DM-RS reduction in subframe dependent variation of control and reference signal overhead. It should be appreciated that the subframe dependent variation may provide a subframe to subframe pattern which is repeated periodically. For example, subframes having less DM-RS reduction (or possibly no DM-RS reduction) may initiate the pattern of subframe dependent variation such that this DM-RS reduction and its corresponding subsequent subframes having more DM-RS reduction are repeated every q subframes (e.g., where q=the number of subframes in the pattern).

The subframe dependent variation techniques implemented according to embodiments of the invention are not limited to configurations in which differing amounts of DM-RS reduction are provided. For example, the embodiment illustrated in FIG. 10B provides a same level of DM-RS reduction with respect to the RBs of each of subframe n (including RB 712n), subframe n+1 (including RB 712n+1), and subframe n+2 (including RB 712 n+2). It should be appreciated that the embodiment illustrated in FIG. 10B provides an example wherein a combination of time-domain bundling (e.g., time-domain bundling having a bundle size of 3) and DM-RS pattern frequency-domain reduction (e.g., DM-RS pattern frequency-domain reduction having a reduction factor of 3) is provided.

By varying the DM-RS pattern as shown in FIG. 10B, subsequent subframes may utilize not only their own DM-RS, but also the DM-RS of one or more earlier subframes to improve the reliability of the decoding provided thereby. Such different DM-RS patterns may thus be utilized to help provide better frequency granularity according to embodiments herein. The use of such different DM-RS patterns in a subframe dependent variation technique may be particularly applicable in combination with time-domain bundling. It should be appreciated that the use of different DM-RS patterns may be utilized in combination with other techniques herein, such as the aforementioned subframe dependent variation wherein one or more subsequent subframe provides more DM-RS reduction than that of a previous subframe.

In order to better utilize DM-RS across subframes for PDSCH decoding in one subframe, embodiments herein apply the same precoding to DM-RS of the two or more subframes to thereby provide a Precoding Subframe Group (PSG). The PSG of embodiments is similar to the concept of PRG, except that the same precoding is applied across subframes. Referring again to FIG. 10B, subframe n (including RB 712n), subframe n+1 (including RB 712n+1), and subframe n+2 (including RB 712 n+2) may each utilize the same precoding and thus comprise a PSG. In operation according to embodiments, decoding PDSCH for subframe n is based on DM-RS in subframe n, while decoding for subframe n+1 is based on DM-RS in subframes n and n+1, decoding for subframe n+2 is based on DM-RS in subframes n, n+1, and n+2, and so on. Such PSG coding techniques work particularly well with time-domain bundling.

Subframes of a PSG grouping may use different Modulation Coding Schemes (MCSs) in correspondence to the improved DM-RS overhead. That is, because the channel and interference estimation is provided for subsequent subframes which utilize the DM-RS of their own subframe and one or more previous subframe, different MCSs may be implemented in such subsequent subframes to provide improved throughput according to embodiments herein.

In addition to or in the alternative to the foregoing, embodiments may implement control and reference signal overhead reduction techniques which are channel dependent. By way of example, because EPDCCH (enhanced PDCCH) has no HARQ, the DM-RS overhead may be different for DM-RS based EPDCCH than the DM-RS overhead for PDSCH. Similarly, since broadcast PDSCH (e.g., system information, paging, RACH response, etc.) targets a large number of UEs, the DM-RS overhead can be different for broadcast PDSCH than for unicast PDSCH. Accordingly, as examples of channel dependent reduction, different ones of the foregoing control and reference signal overhead reduction techniques may be utilized as between EPDCCH and PDSCH, as between broadcast PDSCH and unicast PDSCH, etc.

Channel dependent control and reference signal overhead reduction techniques provided according to embodiments may operate to utilize DM-RS presence in one channel for decoding data in another channel. For example, in accordance with an embodiment herein, the DM-RS used for EPDCCH is also used for PDSCH decoding. Such an embodiment may be utilized, for example, when EPDCCH is close to PDSCH in both frequency and time. In operation according to an embodiment, EPDCCH in subframe n with PRB pair m is used for PDSCH decoding in subframe n+1 and PRB pair m+1, such as where the same precoding is used with respect to EPDCCH and PDSCH. Additionally or alternatively, the decoded tones of EPDCCH may be used to facilitate PDSCH decoding, such as by treating the decoded tones as known information to serve as reference signals for PDSCH. The use of such decoded EPDCCH tones is particularly applicable to PDSCH decoding where the tones of the EPDCCH is close to those of PDSCH in both frequency and time.

Techniques in addition to the aforementioned control and reference signal overhead reduction techniques may be utilized according to embodiments herein to facilitate decoding of data utilizing the reduced DM-RS REs as described above. For example, null tones may be introduced to facilitate interference estimation for improved control and/or data decoding, as shown by null tone REs of FIG. 11. In the illustrated embodiment, time-domain bundling provides for DM-RS presence in RB 712n and no DM-RS presence in RB 712n+1. Likewise, frequency-domain bundling provides for DM-RS presence in RB 712n and no DM-RS presence in RBs 711n and 713n in the illustrated embodiment. It should be appreciated that the combination of time-domain bundling and frequency-domain bundling also provides for no DM-RS presence in RBs 711n+1 and 713n+1. In the RBs in which no DM-RS presence is provided (or where techniques are used for DM-RS pattern alteration to utilize fewer REs) REs are available which would otherwise have been utilized for DM-RS. Although such REs may be utilized for data transmission, as discussed above, embodiments herein implement null tone interference estimation techniques using at least some of these freed REs to facilitate decoding of data.

Figure 11:
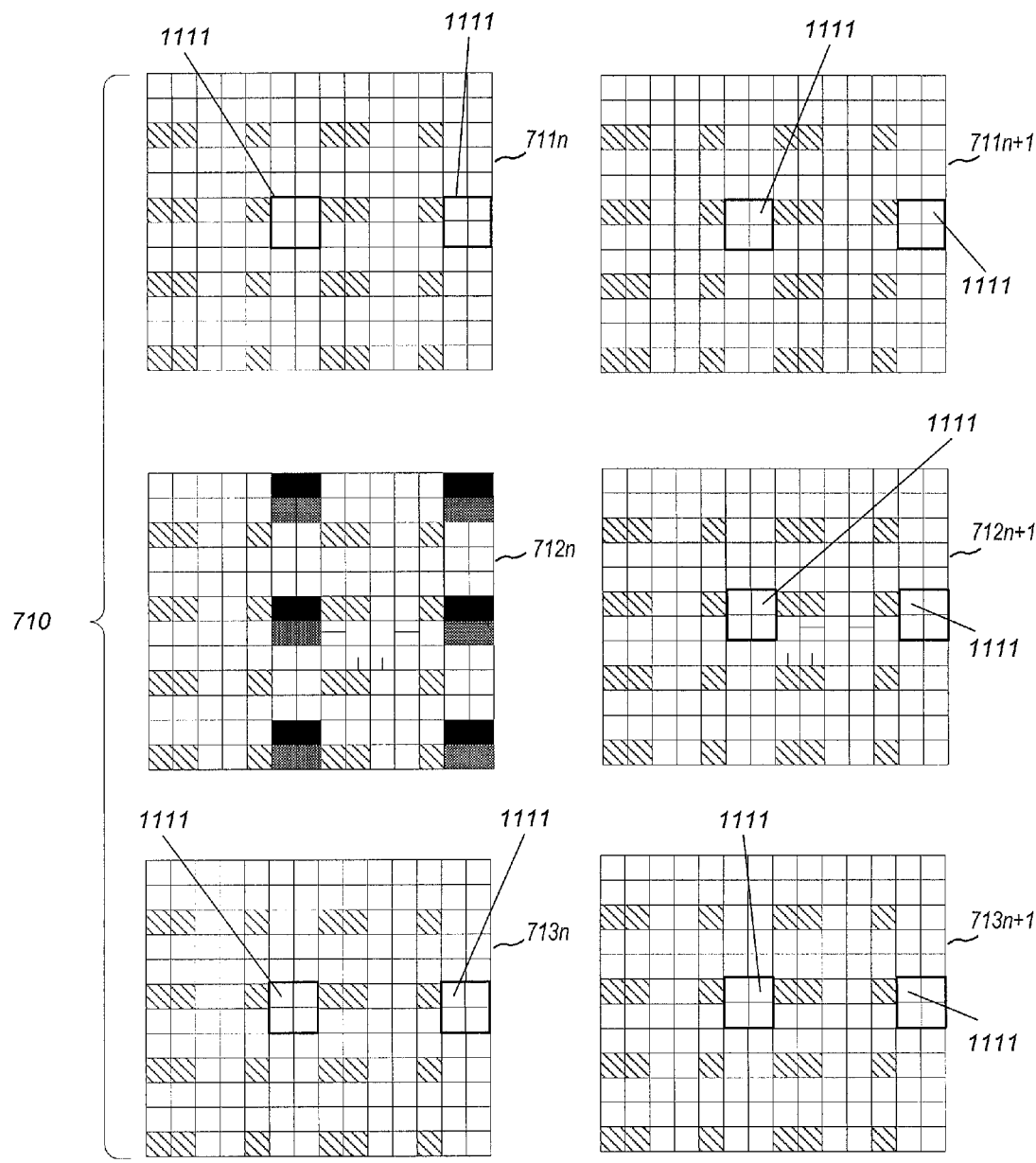
FIG. 11 is a block diagram conceptually illustrating examples of interference estimation techniques implemented in accordance with the concepts herein.

In operation of a null tone interference estimation technique of embodiments herein, null tones (e.g., wherein the underlying carrier is not modulated with data) are introduced with respect to a subset of the otherwise freed REs. The use of such null tones are shown as null tones 1111 in FIG. 11. The null tones of embodiments are used to facilitate interference estimation to address potential interference variations over subframes for time-domain bundling and/or potential interference variations over the communication channel bandwidth for frequency-domain bundling. The null tone REs may thus be analyzed to determine interference experienced with respect to the particular RBs. It should be appreciated that, although the embodiment illustrated in FIG. 11 provides null tones 1111 at REs freed by the non-presence of DM-RS in the RB, null tones of embodiments may additionally or alternatively occupy other REs of a RB.

It should be appreciated that, although the foregoing exemplary embodiments have been described with reference to particular downlink channels, the concepts herein are applicable to other downlink channels and to uplink channels, such as PUCCH, PUSCH, Sounding Reference Signals (SRS), etc. For example, the presence of CSI-RS is not necessary in ever RB, and thus some frequency-domain bundling may be applied with respect to CSI-RS. Similarly, DM-RS for PUSCH can follow the time-domain bundling and/or frequency-domain bundling approaches described above (e.g., DM-RS presence is only provided in a subset of the subframes and/or in a subset of the RBs scheduled for a UE) in order to reduce overhead associated therewith. Likewise, SRS can be transmitted using frequency-domain reduction techniques herein. For example, instead of transmitting SRS over a consecutive number RBs (e.g., N RBs) covering a bandwidth of N RBs, SRS where the channel conditions provide a large coherent bandwidth can be transmitted over N non-consecutive RBs (e.g., every K RBs) covering a bandwidth of N*K RBs. The overhead reduction for SRS can be aligned with that of DM-RS for PUSCH. For example, SRS may be transmitted every 3 RBs, and DM-RS for PUSCH may also be present in every 3 RBs.

It should be appreciated that the foregoing control and/or reference signal overhead reduction techniques, including time-domain bundling, and frequency-domain bundling, DM-RS pattern adaptation (whether DM-RS pattern code-domain reduction, DM-RS pattern timing-domain reduction, or DM-RS pattern frequency-domain reduction) as well as the foregoing interference estimation techniques, including null tone interference estimation, for improved control and/or data decoding may be implemented alone or in combination according to embodiments of the invention. For example, one or more DM-RS bundling technique may be combined with one or more DM-RS pattern adaptation technique to provide control and/or reference signal overhead reduction which is optimized for a particular scenario, which provides a maximum amount of overhead reduction, etc.

Figure 12:
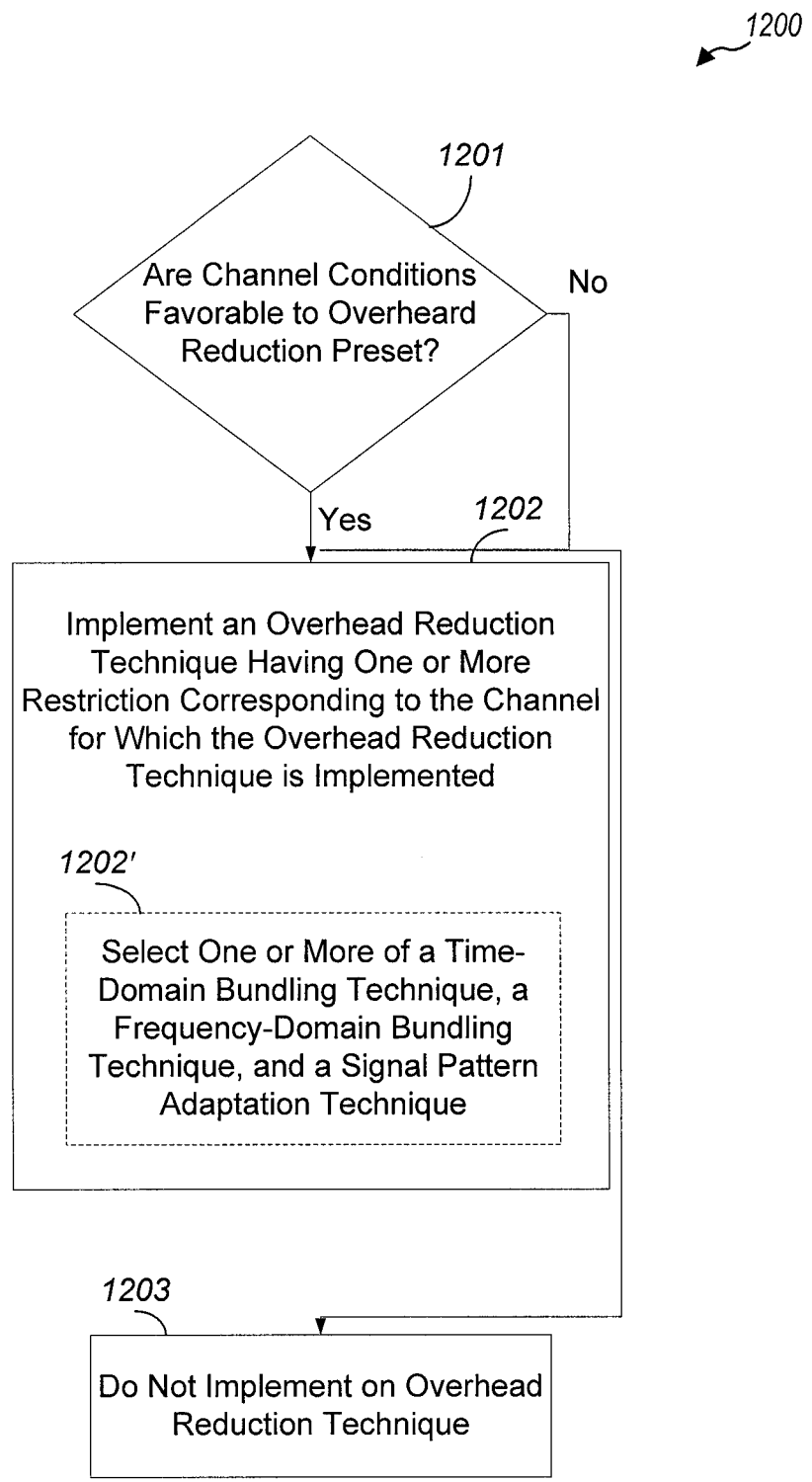
FIGS. 12 and 13 are flow diagrams conceptually illustrating operation to provide overhead reduction in accordance with the concepts herein.
Figure 13:
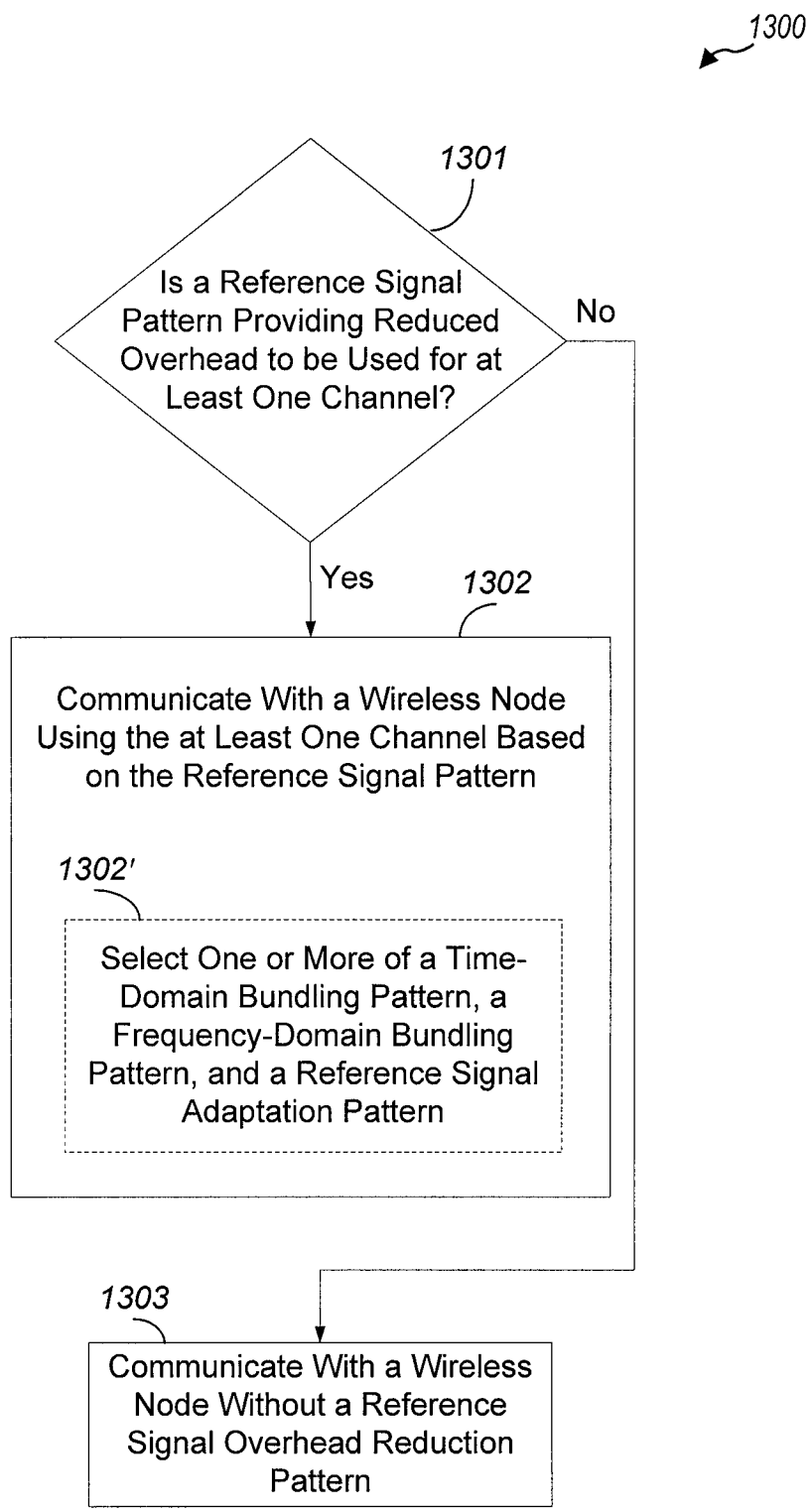

The high level flow diagrams of FIGS. 12 and 13 show operation of embodiments herein to provide control and/or reference signal overhead reduction. In the illustrated embodiment of flow 1200 illustrated in FIG. 12, at block 1201a determination is made as to whether channel conditions are favorable for implementing overhead reduction. For example, it could be determined that a low power class node will be providing the communications with respect to one or more channel for which overhead reduction is desired, and thus small multi-path delay and/or high coherence bandwidth is expected. Additionally or alternatively, monitoring and/or measurement of the channel conditions may be utilized to determine if channel conditions favorable to overhead reduction are present. If, at block 1201, it is determined that channel conditions favorable to overhead reduction are not present, processing according to the illustrated embodiment proceeds to block 1203 wherein communication proceeds without implementing an overhead reduction technique of embodiments herein. However, if, at block 1201, it is determined that channel conditions favorable to overhead reduction are present, processing according to the illustrated embodiment proceeds to block 1202 for implementing an overhead reduction technique of embodiments herein.

At block 1202 of the illustrated embodiment an overhead reduction technique is implemented having one or more restriction corresponding to the channel for which the overhead reduction technique is implemented. For example, where a time-domain bundling technique is implemented a restriction with respect to the position of the presence of DM-RS may be imposed, such as to facilitate HARQ, to avoid decoding delays, to provide a bundling size corresponding to an interference profile experienced or expected with respect to the channel, etc. Where a frequency-domain bundling technique is implemented a restriction with respect to the position of the presence of DM-RS may likewise be imposed, such as to provide proximity in frequency with respect to corresponding resource blocks, to correspond to an interference profile experienced or expected with respect to the channel, to correspond to a precoding subframe grouping used in the channel, etc. Where a signal pattern adaptation technique (e.g., DM-RS pattern code-domain reduction, DM-RS pattern timing-domain reduction, and DM-RS pattern frequency-domain reduction) is implemented a restriction with respect to the number and/or position of reference signal resource elements may be imposed, such as to provide a spreading factor facilitating reduced overhead, a series of reference signal patterns used in combination to decode data, etc.

It should be appreciated that implementing an overhead reduction technique at block 1202 of embodiments herein may include selecting one or more overhead reduction techniques from a plurality of available overhead reduction techniques. Accordingly, block 1202' (shown as an optional process) provides for selection of one or more appropriate or desired overhead reduction technique from time-domain bundling, frequency-domain bundling and/or signal pattern adaptation. The selection of a particular overhead reduction technique may be based upon the particular channel for which the technique is to be implemented, the channel conditions experienced and/or expected with respect to the channel, etc. As an example, if the coherence bandwidth is large, frequency-domain bundling can be preferably used. If coherence time is large and interference conditions are more stable over subframes, time-domain bundling can be preferably be used. If both coherence bandwidth and coherence time is large, both frequency-domain and time-domain bundling schemes can be used.

In the illustrated embodiment of flow 1300 illustrated in FIG. 13, at block 1301 determining if a reference signal (RS) frequency-domain bundling pattern providing reduced overhead is to be used for at least one channel. For example, a low power class node may be providing the communications with respect to one or more channel for which overhead reduction is desired, and thus one or more overhead reduction technique may be implemented because small multi-path delay and/or high coherence bandwidth is expected. If, at block 1301, it is determined that a reference signal providing reduced overhead is not to be used, processing according to the illustrated embodiment proceeds to block 1303 wherein communication proceeds without implementing an overhead reduction technique of embodiments herein. However, if, at block 1301, it is determined that a reference signal providing reduced overhead is to be used, processing according to the illustrated embodiment proceeds to block 1302 for communicating with a wireless node using an overhead reduction technique of embodiments herein.

At block 1302 of the illustrated embodiment communication with a wireless node using an overhead reduction technique is conducted. In particular, in accordance with the illustrated embodiment the communications with the wireless node use the at least one channel based on the reference signal pattern providing the reduced overhead. For example, where a frequency-domain bundling technique is implemented, a reference signal frequency-domain reference signal pattern may be implemented with respect to the at least one channel. A restriction with respect to the position of the presence of DM-RS may be imposed, such as to provide proximity in frequency with respect to corresponding resource blocks, to correspond to an interference profile experienced or expected with respect to the channel, to correspond to a precoding subframe grouping used in the channel, etc. Where a time-domain bundling technique is implemented, a reference signal time-domain reference signal pattern may be implemented with respect to the at least one channel, wherein a restriction with respect to the position of the presence of DM-RS may be imposed, such as to facilitate HARQ, to avoid decoding delays, to provide a bundling size corresponding to an interference profile experienced or expected with respect to the channel, etc. Where a signal pattern adaptation technique (e.g., DM-RS pattern code-domain reduction, DM-RS pattern timing-domain reduction, and DM-RS pattern frequency-domain reduction) is implemented, a reference signal adaptation pattern may be implemented with respect to the at least one channel. A restriction with respect to the number and/or position of reference signal resource elements may be imposed, such as to provide a spreading factor facilitating reduced overhead, a series of reference signal patterns used in combination to decode data, etc.

It should be appreciated that communicating with the wireless node using the at least one channel based on the reference signal pattern at block 1302 of embodiments herein may include selecting one or more overhead reduction techniques from a plurality of available overhead reduction techniques. Accordingly, block 1302' (shown as an optional process) provides for selection of one or more appropriate or desired overhead reduction technique from time-domain bundling, frequency-domain bundling and/or signal pattern adaptation. The selection of a particular overhead reduction technique may be based upon the particular channel for which the technique is to be implemented, the channel conditions experienced and/or expected with respect to the channel, etc. As an example, if the coherence bandwidth is large, frequency-domain bundling can be preferably used. If coherence time is large and interference conditions are more stable over subframes, time-domain bundling can be preferably be used. If both coherence bandwidth and coherence time is large, both frequency-domain and time-domain bundling schemes can be used.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 2 and 5 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
    determining, based on a channel condition for at least one channel between a user equipment (UE) and a base station, if a reference signal (RS) frequency-domain bundling pattern providing reduced RS presence is to be used for the at least one channel, wherein the RS frequency-domain bundling pattern comprises a bundle of two or more resource blocks spanning a frequency domain, wherein RS presence is omitted from at least a first resource block of the bundle of two or more resource blocks and RS presence is included in at least a second resource block of the bundle of two or more resource blocks, and wherein the second resource block is selected to have the RS presence based on a proximity of the second resource block to other resource blocks in the bundle of two or more resource blocks; and
    communicating using the at least one channel based on the RS frequency-domain bundling pattern with reduced RS presence.

2. The method of claim 1, wherein the determining is under channel conditions favorable to implementation of the RS frequency-domain bundling pattern.

3. The method of claim 1, wherein the frequency-domain bundling pattern is implemented when a coherence bandwidth is large.

4. The method of claim 1, further comprising:
    determining if one or more additional RS pattern providing reduced RS presence is to be used for the at least one channel; and
    communicating with the UE using the at least one channel based on the RS frequency-domain bundling pattern and the one or more additional RS pattern providing reduced RS presence.

5. The method of claim 4, wherein the one or more additional RS pattern providing reduced RS presence includes a RS time-domain bundling pattern providing reduced RS presence.

6. The method of claim 5, wherein the RS time-domain bundling pattern includes a restriction with respect to a position of a reference signal presence in resource blocks of a time-domain bundle.

7. The method of claim 6, wherein the restriction with respect to the position of the reference signal presence provides for presence of the reference signal in a first resource block of the time-domain bundle.

8. The method of claim 5, wherein the one or more additional RS pattern includes a restriction with respect to a bundling size of a time-domain bundle.

9. The method of claim 4, wherein the one or more additional RS pattern providing reduced RS presence includes a code-domain reduction pattern.

10. The method of claim 9, wherein the code-domain reduction pattern includes a restriction with respect to a spreading factor used for the channel for which the reduced RS presence is implemented.

11. The method of claim 4, wherein the one or more additional RS pattern providing reduced RS presence includes a time-domain reduction pattern.

12. The method of claim 11, wherein the time-domain reduction pattern includes a restriction with respect to columns of resource elements of a reference signal used for the channel for which the reduced RS presence is implemented.

13. The method of claim 1, wherein the RS frequency-domain bundle pattern includes a restriction with respect to a bundling size of the frequency-domain bundle.

14. The method of claim 13, wherein the restriction with respect to the bundling size provides a bundling size corresponding to a precoding subframe grouping used in the channel for which the RS frequency-domain bundling pattern is implemented.

15. The method of claim 1, further comprising:
    selecting the RS frequency-domain bundling pattern for providing reduced RS presence from a plurality of RS presence reduction patterns, wherein the plurality of RS presence reduction patterns include a pattern without any RS presence reduction.

16. The method of claim 15, wherein different RS presence reduction patterns of the plurality of RS presence reduction patterns are implemented for at least one of a data channel dedicated to the UE or a data channel for a group of UEs.

17. The method of claim 15, wherein the plurality of RS presence reduction patterns comprises at least two RS presence reduction techniques, and wherein the at least two RS presence reduction patterns are selected from the group consisting of:
    a RS time-domain bundling pattern;
    the RS frequency-domain bundling pattern; and
    a RS signal pattern adaptation.

18. The method of claim 1, further comprising:
    using null tone resource elements in the channel for which the RS frequency-domain bundling pattern is implemented to determine an interference profile for the channel.

19. The method of claim 18 wherein the null tone resource elements are disposed at resource elements freed from use as a reference signal by operation of one or more RS presence reduction technique of the RS frequency-domain bundling pattern.

20. The method of claim 1, wherein the at least one channel includes at least one of a control channel, a data channel, or a sounding reference channel.

21. The method of claim 1, wherein the RS includes at least one of a channel state information reference signal (CSI-RS), a demodulation reference signal (DM-RS) for downlink, a DM-RS for uplink, and a sound reference signal.

22. A method of wireless communication, comprising:
    determining, based on a channel condition for at least one channel between a user equipment (UE) and a base station, if a first reference signal (RS) pattern with a first spreading factor is to be used, or a RS code-domain reduction pattern providing reduced RS presence with a second spreading factor higher than the first spreading factor is to be used for the at least one channel, wherein at least one of the first RS pattern or the RS code-domain reduction pattern comprises a bundle of two or more resource blocks spanning a frequency domain, wherein RS presence is omitted from at least a first resource block of the bundle of two or more resource blocks and RS presence is included in at least a second resource block of the bundle of two or more resource blocks, and wherein the second resource block is selected to have the RS presence based on a proximity of the second resource block to other resource blocks in the bundle of two or more resource blocks; and
    communicating using the at least one channel based on the determined first RS pattern or the determined RS code-domain reduction pattern with reduced RS presence.

23. The method of claim 22, wherein the determining is under channel conditions favorable to implementation of RS presence reduction.

24. The method of claim 22, wherein the code-domain reduction pattern includes a restriction with respect to a spreading factor used for the channel for which the RS code-domain reduction pattern is implemented.

25. The method of claim 22, further comprising:
determining if one or more additional RS pattern providing reduced RS presence is to be used for the at least one channel; and
communicating using the at least one channel based on the RS code-domain reduction pattern and the one or more additional RS pattern providing reduced RS presence.

26. The method of claim 25, wherein the one or more additional RS pattern providing reduced RS presence includes a RS time-domain bundling pattern providing reduced RS presence.

27. The method of claim 26, wherein the RS time-domain bundling pattern includes a restriction with respect to a position of a reference signal presence in resource blocks of a time-domain bundle.

28. The method of claim 27, wherein the restriction with respect to the position of the reference signal presence provides for presence of the reference signal in a first resource block of the time-domain bundle.

29. The method of claim 26, wherein the one or more additional RS pattern includes a restriction with respect to a bundling size of a time-domain bundle.

30. The method of claim 25, wherein the one or more additional RS pattern providing reduced RS presence includes a frequency-domain bundling pattern providing reduced RS presence.

31. The method of claim 30, wherein the RS frequency-domain bundling pattern includes a restriction with respect to a position of a reference signal presence in resource blocks of a frequency-domain bundle.

32. The method of claim 31, wherein the restriction with respect to the position of the reference signal presence in the resource blocks of the frequency-domain bundle provides proximity in frequency with respect to one or more corresponding resource block of the frequency-domain bundle.

33. The method of claim 30, wherein the one or more additional RS pattern includes a restriction with respect to a bundling size of a frequency-domain bundle.

34. The method of claim 33, wherein the restriction with respect to the bundling size provides a bundling size corresponding to a precoding subframe grouping used in the channel for which the reduced RS presence is implemented.

35. The method of claim 25, wherein the one or more additional RS pattern providing reduced RS presence includes a time-domain reduction pattern.

36. The method of claim 35, wherein the time-domain reduction pattern includes a restriction with respect to columns of resource elements of a reference signal used for the channel for which the reduced RS presence is implemented.

37. The method of claim 25, wherein the one or more additional RS pattern providing reduced RS presence includes a frequency-domain reduction pattern.

38. The method of claim 37, wherein the frequency-domain reduction pattern includes a restriction with respect to rows of resource elements of a reference signal used for the channel for which the reduced RS presence is implemented.

39. The method of claim 22, further comprising:
selecting the RS code-domain reduction pattern for providing reduced RS presence from a plurality of RS presence reduction patterns, wherein the plurality of RS presence reduction patterns include a pattern without RS presence reduction.

40. The method of claim 39, wherein different RS presence reduction patterns of the plurality of RS presence reduction patterns are implemented for at least one of a data channel dedicated to the UE or a data channel for a group of UEs.

41. The method of claim 39, wherein the plurality of RS presence reduction patterns comprises at least two RS presence reduction techniques, and wherein the at least two RS presence reduction patterns are selected from the group consisting of:
a RS time-domain bundling pattern;
a RS frequency-domain bundling pattern; and
a RS signal pattern adaptation.

42. The method of claim 22, further comprising:
using null tone resource elements in the channel for which the reduced RS presence is implemented to determine an interference profile for the channel.

43. The method of claim 42, wherein the null tone resource elements are disposed at resource elements freed from use as a reference signal by operation of one or more RS presence reduction technique of the RS code-domain reduction pattern.

44. The method of claim 22, wherein the at least one channel includes at least one of a control channel, a data channel, or a sounding reference channel.

45. The method of claim 22, wherein the RS includes at least one of a channel state information reference signal (CSI-RS), a demodulation reference signal (DM-RS) for downlink, a DM-RS for uplink, or a sound reference signal.

46. A non-transitory computer-readable medium having program code recorded thereon, comprising:
program code to determine, based on a channel condition for at least one channel between a user equipment (UE) and a base station, if a first reference signal (RS) pattern with a first spreading factor is to be used, or a RS code-domain reduction pattern providing reduced RS presence with a second spreading factor higher than the first spreading factor is to be used for the at least one channel, wherein at least one of the first RS pattern or the RS code-domain reduction pattern comprises a bundle of two or more resource blocks spanning a frequency domain, wherein RS presence is omitted from at least a first resource block of the bundle of two or more resource blocks and RS presence is included in at least a second resource block of the bundle of two or more resource blocks, and wherein the second resource block is selected to have the RS presence based on a proximity of the second resource block to other resource blocks in the bundle of two or more resource blocks; and
program code to communicate using the at least one channel based on the determined first RS pattern or the determined RS code-domain reduction pattern with reduced RS presence.

47. A non-transitory computer-readable medium having program code recorded thereon, comprising:
program code to determine, based on a channel condition for at least one channel between a user equipment (UE) and a base station, if a reference signal (RS) frequency-domain bundling pattern providing reduced RS presence is to be used for the at least one channel, wherein the RS frequency-domain bundling pattern comprises a bundle of two or more resource blocks spanning a frequency domain, wherein RS presence is omitted from at least a first resource block of the bundle of two or more resource blocks and RS presence is included in at least a second resource block of the bundle of two or more resource blocks, and wherein the second resource block is selected to have the RS presence based on a proximity of the second resource block to other resource blocks in the bundle of two or more resource blocks; and program code to communicate using the at least one channel based on the RS frequency-domain bundling pattern with reduced RS presence.

48. An apparatus configured for wireless communication, comprising:

means for determining, based on a channel condition for at least one channel between a user equipment (UE) and a base station, if a first reference signal (RS) pattern with a first spreading factor is to be used, or a RS code-domain reduction pattern providing reduced RS presence with a second spreading factor higher than the first spreading factor is to be used for the at least one channel, wherein at least one of the first RS pattern or the RS code-domain reduction pattern comprises a bundle of two or more resource blocks spanning a frequency domain, wherein RS presence is omitted from at least a first resource block of the bundle of two or more resource blocks and RS presence is included in at least a second resource block of the bundle of two or more resource blocks, and wherein the second resource block is selected to have the RS presence based on a proximity of the second resource block to other resource blocks in the bundle of two or more resource blocks; and means for communicating using the at least one channel based on determined first RS pattern or the determined the RS code-domain reduction pattern with reduced RS presence.

49. An apparatus configured for wireless communication, comprising:

means for determining, based on a channel condition for at least one channel between a user equipment (UE) and a base station, if a reference signal (RS) frequency-domain bundling pattern providing reduced RS presence is to be used for the at least one channel, wherein the RS frequency-domain bundling pattern comprises a bundle of two or more resource blocks spanning a frequency domain, wherein RS presence is omitted from at least a first resource block of the bundle of two or more resource blocks and RS presence is included in at least a second resource block of the bundle of two or more resource blocks, and wherein the second resource block is selected to have the RS presence based on a proximity of the second resource block to other resource blocks in the bundle of two or more resource blocks; and means for communicating using the at least one channel based on the RS frequency-domain bundling pattern with reduced RS presence.

50. An apparatus configured for wireless communication, the apparatus comprising:

at least one processor; and
a memory coupled to the at least one processor,
wherein the at least one processor is configured:
to determine, based on a channel condition for at least one channel between a user equipment (UE) and a base station, if a reference signal (RS) frequency-domain bundling pattern providing reduced RS presence is to be used for the at least one channel, wherein the RS frequency-domain bundling pattern comprises a bundle of two or more resource blocks spanning a frequency domain, wherein RS presence is omitted from at least a first resource block of the bundle of two or more resource blocks and RS presence is included in at least a second resource block of the bundle of two or more resource blocks, and wherein the second resource block is selected to have the RS presence based on a proximity of the second resource block to other resource blocks in the bundle of two or more resource blocks; and to communicate using the at least one channel based on a RS frequency-domain bundling pattern with reduced RS presence.

51. The apparatus of claim 50, wherein the at least one processor is configured to determine if channel conditions are favorable to implementation of the RS frequency-domain bundling pattern.

52. The apparatus of claim 50, wherein the frequency-domain bundling pattern is implemented when a coherence bandwidth is large.

53. The apparatus of claim 50, wherein the at least one processor is further configured:

to determine if one or more additional RS pattern providing reduced RS presence is to be used for the at least one channel; and
to initiate communication with the UE using the at least one channel based on the RS frequency-domain bundling pattern and the one or more additional RS pattern providing reduced RS presence.

54. The apparatus of claim 53, wherein the one or more additional RS pattern providing reduced RS presence includes a RS time-domain bundling pattern providing reduced RS presence.

55. The apparatus of claim 54, wherein the RS time-domain bundling pattern includes a restriction with respect to a position of a reference signal presence in resource blocks of a time-domain bundle.

56. The apparatus of claim 55, wherein the restriction with respect to the position of the reference signal presence provides for presence of the reference signal in a first resource block of a time-domain bundle.

57. The apparatus of claim 54, wherein the one or more additional RS pattern includes a restriction with respect to a bundling size of a time-domain bundle.

58. The apparatus of claim 53, wherein the one or more additional RS pattern providing reduced RS presence includes a code-domain reduction pattern.

59. The apparatus of claim 58, wherein the code-domain pattern includes a restriction with respect to a spreading factor used for the channel for which the reduced RS presence is implemented.

60. The apparatus of claim 53, wherein the one or more additional RS pattern providing reduced RS presence includes a time-domain reduction pattern.

61. The apparatus of claim 60, wherein the time-domain reduction pattern includes a restriction with respect to columns of resource elements of a reference signal used for the channel for which the reduced RS presence is implemented.

62. The apparatus of claim 50, wherein the at least one processor is configured to implement a restriction with respect to a position of a reference signal presence in a plurality of resource blocks of the frequency-domain bundle, and wherein the restriction includes a restriction with respect to a bundling size of the frequency-domain bundle.

63. The apparatus of claim 62, wherein the restriction with respect to the bundling size provides a bundling size corresponding to a precoding subframe grouping used in the channel for which the RS frequency-domain bundle pattern is implemented.

64. The apparatus of claim 50, wherein the at least one processor is further configured:
to select the RS frequency-domain bundling pattern for providing reduced RS presence from a plurality of RS presence reduction patterns, wherein the plurality of RS presence reduction patterns include a pattern without RS presence reduction.

65. The apparatus of claim 64, wherein different RS presence reduction patterns of the plurality of RS presence reduction patterns are implemented for at least one of a data channel dedicated to the UE or a data channel for a group of UEs.

66. The apparatus of claim 64, wherein the plurality of RS presence reduction patterns comprises at least two RS presence reduction techniques, and wherein the at least two RS presence reduction patterns are selected from the group consisting of:
a RS time-domain bundling pattern;
the RS frequency-domain bundling pattern; and
a RS signal pattern adaptation.

67. The apparatus of claim 50, wherein the at least one processor is further configured:
to use null tone resource elements in the channel for which the reduced RS presence is implemented for determining an interference profile for the channel.

68. The apparatus of claim 67, wherein the null tone resource elements are disposed at resource elements freed from use as a reference signal by operation of one or more RS presence reduction technique of the RS frequency-domain reduction pattern.

69. The apparatus of claim 50, wherein the at least one channel includes at least one of a control channel, a data channel, or a sounding reference channel.

70. The apparatus of claim 50, wherein the RS includes at least one of a channel state information reference signal (CSI-RS), a demodulation reference signal (DM-RS) for downlink, a DM-RS for uplink, or a sound reference signal.

71. An apparatus configured for wireless communication, the apparatus comprising:
at least one processor; and
a memory coupled to the at least one processor,
wherein the at least one processor is configured:
to determine, based on a channel condition for at least one channel between a user equipment (UE) and a base station, if a first reference signal (RS) pattern with a first spreading factor is to be used, or a RS code-domain reduction pattern providing reduced RS presence with a second spreading factor higher than the first spreading factor is to be used for the at least one channel, wherein at least one of the first RS pattern or the RS code-domain reduction pattern comprises a bundle of two or more resource blocks spanning a frequency domain, wherein RS presence is omitted from at least a first resource block of the bundle of two or more resource blocks and RS presence is included in at least a second resource block of the bundle of two or more resource blocks, and wherein the second resource block is selected to have the RS presence based on a proximity of the second resource block to other resource blocks in the bundle of two or more resource blocks; and
to communicate using the at least one channel based on the determined first RS pattern or the determined RS code-domain reduction pattern with reduced RS presence.

* * * * *